(12) United States Patent
Sakamoto et al.

(10) Patent No.: US 6,532,010 B2
(45) Date of Patent: *Mar. 11, 2003

(54) THREE-DIMENSIONAL MAP NAVIGATION DISPLAY DEVICE AND DEVICE FOR CREATING DATA USED THEREIN

(75) Inventors: Kiyomi Sakamoto, Ikoma (JP); Yutaka Takahira, Neyagawa (JP); Teruaki Ata, Neyagawa (JP); Yoshiki Ueyama, Sakai (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/075,343

(22) Filed: Feb. 15, 2002

(65) Prior Publication Data

US 2002/0076099 A1 Jun. 20, 2002

Related U.S. Application Data

(62) Division of application No. 09/319,864, filed as application No. PCT/JP98/04853 on Oct. 27, 1998, now Pat. No. 6,411,293.

(30) Foreign Application Priority Data

Oct. 27, 1997 (JP) ............................................. 9-294610
Mar. 16, 1998 (JP) ............................................. 10-65010
Jun. 11, 1998 (JP) ............................................. 10-163962

(51) Int. Cl.⁷ .............................................. G06T 15/00
(52) U.S. Cl. ...................................................... 345/419
(58) Field of Search ................................ 345/419, 420, 345/423, 427, 428, 157, 164, 473, 629

(56) References Cited

U.S. PATENT DOCUMENTS

| | | | | |
|---|---|---|---|---|
| 5,714,977 A | * | 2/1998 | McNeil ...................... | 345/157 |
| 5,912,675 A | * | 6/1999 | Laperriere ................... | 345/473 |
| 5,936,612 A | * | 8/1999 | Wang .......................... | 345/164 |
| 6,225,978 B1 | * | 5/2001 | McNeil ........................ | 345/157 |
| 6,292,198 B1 | * | 9/2001 | Matsuda et al. ............. | 345/473 |
| 6,348,923 B2 | * | 2/2002 | Murata ........................ | 345/629 |
| 6,411,293 B1 | * | 6/2002 | Sakamoto et al. ........... | 345/419 |

FOREIGN PATENT DOCUMENTS

| | | |
|---|---|---|
| JP | 61-215922 | 9/1986 |
| JP | 63-211100 | 9/1988 |
| JP | 3-150700 | 6/1991 |
| JP | 9-054544 | 2/1997 |
| JP | 9-171348 | 6/1997 |
| JP | 09-171348 | 6/1997 |

* cited by examiner

Primary Examiner—Phu K. Nguyen
(74) Attorney, Agent, or Firm—Wenderoth, Lind & Ponack, L.L.P.

(57) ABSTRACT

A model transforming data generating portion 4 extracts parameter data corresponding to a given road area from two-dimensional map data in a two-dimensional map data storage portion 3. Subsequently, the model transforming data generating portion 4 reads out pattern data corresponding to the specified road area from a pattern model storage portion 5 and generates model transforming data. An image data generating portion 6 transforms a corresponding three-dimensional map display model by using the generated model transforming data to generate three-dimensional image data. The generated three-dimensional image data is given to and displayed in a display 7. The operator operates an input portion 2 on the basis of the contents displayed in the display 7 to correct the generated model transforming data.

15 Claims, 39 Drawing Sheets

FIG. 5

| LINK NO. | LENGTH | NUMBER OF LANES | LINK ATTRIBUTE | PASSAGE DIRECTION |
|---|---|---|---|---|
| 1 | 20 | 4 | ORDINARY-TYPE | BIDIRECTIONAL |
| 2 | 10 | 4 | ORDINARY-TYPE | BIDIRECTIONAL |
| 3 | 20 | 3 | ORDINARY-TYPE | BIDIRECTIONAL |
| 4 | 20 | 2 | ELEVATED | BIDIRECTIONAL |
| 5 | 10 | 2 | ELEVATED | BIDIRECTIONAL |
| 6 | 50 | 4 | ORDINARY-TYPE | BIDIRECTIONAL |
| 7 | 5 | 1 | SIDE PASS | ONE-WAY |
| 8 | 5 | 1 | SIDE PASS | ONE-WAY |
| 9 | 10 | 1 | SIDE PASS | ONE-WAY |
| 10 | 2 | 1 | SIDE PASS | ONE-WAY |
| 11 | 5 | 1 | SIDE PASS | ONE-WAY |
| 12 | 3 | 1 | SIDE PASS | ONE-WAY |
| 13 | 4 | 1 | SIDE PASS | ONE-WAY |
| 14 | 6 | 1 | SIDE PASS | ONE-WAY |
| 15 | 20 | 2 | ORDINARY-TYPE | BIDIRECTIONAL |
| 16 | 30 | 2 | ORDINARY-TYPE | BIDIRECTIONAL |
| 17 | 5 | 2 | UNDERPASS | BIDIRECTIONAL |
| 18 | 15 | 2 | UNDERPASS | BIDIRECTIONAL |
| 19 | 10 | 2 | UNDERPASS | BIDIRECTIONAL |
| 20 | 15 | 2 | ORDINARY-TYPE | BIDIRECTIONAL |
| 21 | 5 | 2 | ORDINARY-TYPE | BIDIRECTIONAL |
| 22 | 20 | 3 | ORDINARY-TYPE | BIDIRECTIONAL |
| 23 | 10 | 2 | ORDINARY-TYPE | BIDIRECTIONAL |

FIG. 12

| LINK NO. | LENGTH | WIDTH | CONFIGURATION PATTERN ||||| INTERSECTING ANGLE |
| | | | ROAD SHAPE | ELEVATED-ROAD SHAPE | CONNECTION SHAPE | HEIGHT | |
|---|---|---|---|---|---|---|---|
| | | | | | | | |

FIG. 13

| ROAD NO. | LINK NO. | LENGTH | NUMBER OF LANES | LINK ATTRIBUTE | PASSAGE DIRECTION |
|---|---|---|---|---|---|
| 1 | 1 | 20 | 4 | ORDINARY-TYPE | BIDIRECTIONAL |
| 1 | 2 | 10 | 4 | ORDINARY-TYPE | BIDIRECTIONAL |
| 1 | 3 | 20 | 3 | ORDINARY-TYPE | BIDIRECTIONAL |
| 2 | 4 | 20 | 2 | ELEVATED | BIDIRECTIONAL |
| 2 | 5 | 10 | 2 | ELEVATED | BIDIRECTIONAL |
| 3 | 6 | 50 | 4 | ORDINARY-TYPE | BIDIRECTIONAL |
| 4 | 7 | 5 | 1 | SIDE PASS | ONE-WAY |
| 4 | 8 | 5 | 1 | SIDE PASS | ONE-WAY |
| 5 | 9 | 10 | 1 | SIDE PASS | ONE-WAY |
| 6 | 10 | 2 | 1 | SIDE PASS | ONE-WAY |
| 6 | 11 | 5 | 1 | SIDE PASS | ONE-WAY |
| 6 | 12 | 3 | 1 | SIDE PASS | ONE-WAY |
| 7 | 13 | 4 | 1 | SIDE PASS | ONE-WAY |
| 7 | 14 | 6 | 1 | SIDE PASS | ONE-WAY |
| 8 | 15 | 20 | 2 | ORDINARY-TYPE | BIDIRECTIONAL |
| 8 | 16 | 30 | 2 | ORDINARY-TYPE | BIDIRECTIONAL |
| 9 | 17 | 5 | 2 | UNDERPASS | BIDIRECTIONAL |
| 9 | 18 | 15 | 2 | UNDERPASS | BIDIRECTIONAL |
| 9 | 19 | 10 | 2 | UNDERPASS | BIDIRECTIONAL |
| 10 | 20 | 15 | 2 | ORDINARY-TYPE | BIDIRECTIONAL |
| 10 | 21 | 5 | 2 | ORDINARY-TYPE | BIDIRECTIONAL |
| 10 | 22 | 20 | 3 | ORDINARY-TYPE | BIDIRECTIONAL |
| 10 | 23 | 10 | 2 | ORDINARY-TYPE | BIDIRECTIONAL |

FIG. 16

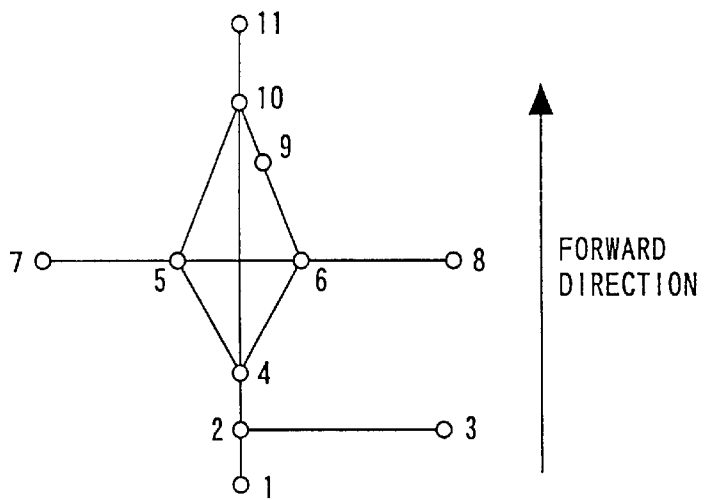

FIG. 17

| LINK | LINK DATA | | DECISION |
|---|---|---|---|
| | ATTRIBUTE | TYPE | |
| 1-2 | | MAIN ROAD | APPROACH TO BRANCHING POINT |
| 2-3 | | | CROSS ROAD 1 |
| 2-4 | | MAIN ROAD | APPROACH TO BRANCHING POINT |
| 4-5 | | SIDE PASS | FORWARD BRANCHING SIDE PASS |
| 4-6 | | SIDE PASS | OPPOSITE-DIRECTION MERGING SIDE PASS |
| 4-10 | MAIN ROAD | MAIN ROAD | ELEVATED ROAD |
| 5-7 | | | CROSS ROAD 2 |
| 5-6 | | | CROSS ROAD 3 |
| 6-8 | | | CROSS ROAD 4 |
| 5-10 | | SIDE PASS | FORWARD MERGING SIDE PASS |
| 6-9 | | SIDE PASS | OPPOSITE-DIRECTION BRANCHING SIDE PASS |
| 9-10 | | SIDE PASS | OPPOSITE-DIRECTION BRANCHING SIDE PASS |
| 10-11 | | MAIN ROAD | APPROACH FROM INTERSECTION |

FIG. 18

| ROAD FUNCTION CATEGORY | LINK | |
|---|---|---|
| ELEVATED ROAD | 4-10 | |
| FORWARD BRANCHING SIDE PASS | 4-5 | |
| FORWARD MERGING SIDE PASS | 5-10 | |
| OPPOSITE-DIRECTION MERGING SIDE PASS | 4-6 | |
| OPPOSITE-DIRECTION BRANCHING SIDE PASS | 6-9 | 9-10 |
| APPROACH TO BRANCHING POINT | 1-2 | 2-4 |
| APPROACH FROM INTERSECTION | 10-11 | |
| CROSS ROAD 1 | 2-3 | |
| CROSS ROAD 2 | 5-7 | |
| CROSS ROAD 3 | 5-6 | |
| CROSS ROAD 4 | 6-8 | |

FIG. 19

| ROAD NO. | LENGTH | NUMBER OF LANES | LINK ATTRIBUTE | PASSAGE DIRECTION |
|---|---|---|---|---|
| 1 | 50 | 4 | ORDINARY-TYPE | BIDIRECTIONAL |
| 2 | 30 | 2 | ELEVATED | BIDIRECTIONAL |
| 3 | 50 | 4 | ORDINARY-TYPE | BIDIRECTIONAL |
| 4 | 10 | 1 | SIDE PASS | ONE-WAY |
| 5 | 10 | 1 | SIDE PASS | ONE-WAY |
| 6 | 10 | 1 | SIDE PASS | ONE-WAY |
| 7 | 10 | 1 | SIDE PASS | ONE-WAY |
| 8 | 50 | 2 | ORDINARY-TYPE | BIDIRECTIONAL |
| 9 | 30 | 2 | UNDERPASS | BIDIRECTIONAL |
| 10 | 50 | 2 | ORDINARY-TYPE | BIDIRECTIONAL |

FIG. 21

| LINK NO. | LENGTH | WIDTH | CONFIGURATION PATTERN ||||| HEIGHT | INTERSECTING ANGLE |
| --- | --- | --- | --- | --- | --- | --- | --- | --- |
| | | | ROAD SHAPE | ELEVATED-ROAD SHAPE | CONNECTION SHAPE || | |
| 1 | 50 | 4 | 1 | | | | | |
| 2 | 30 | 2 | | 1 | 1 | a | 1 | 15° |
| 3 | 50 | 4 | 1 | | | | | |
| 4 | 10 | 1 | 1 | 1 | 1 | c | | |
| 5 | 10 | 1 | 1 | | 1 | a | | |
| 6 | 10 | 1 | 1 | | 1 | d | | |
| 7 | 10 | 1 | 1 | | 1 | b | | |
| 8 | 50 | 2 | 1 | | 1 | d | | |
| 9 | 30 | 2 | 1 | | 1 | b | 0 | 15° |
| 10 | 50 | 2 | 1 | | | | | |

BRANCHING/MERGING SHAPE

CORRESPONDING LINK

F I G. 2 7
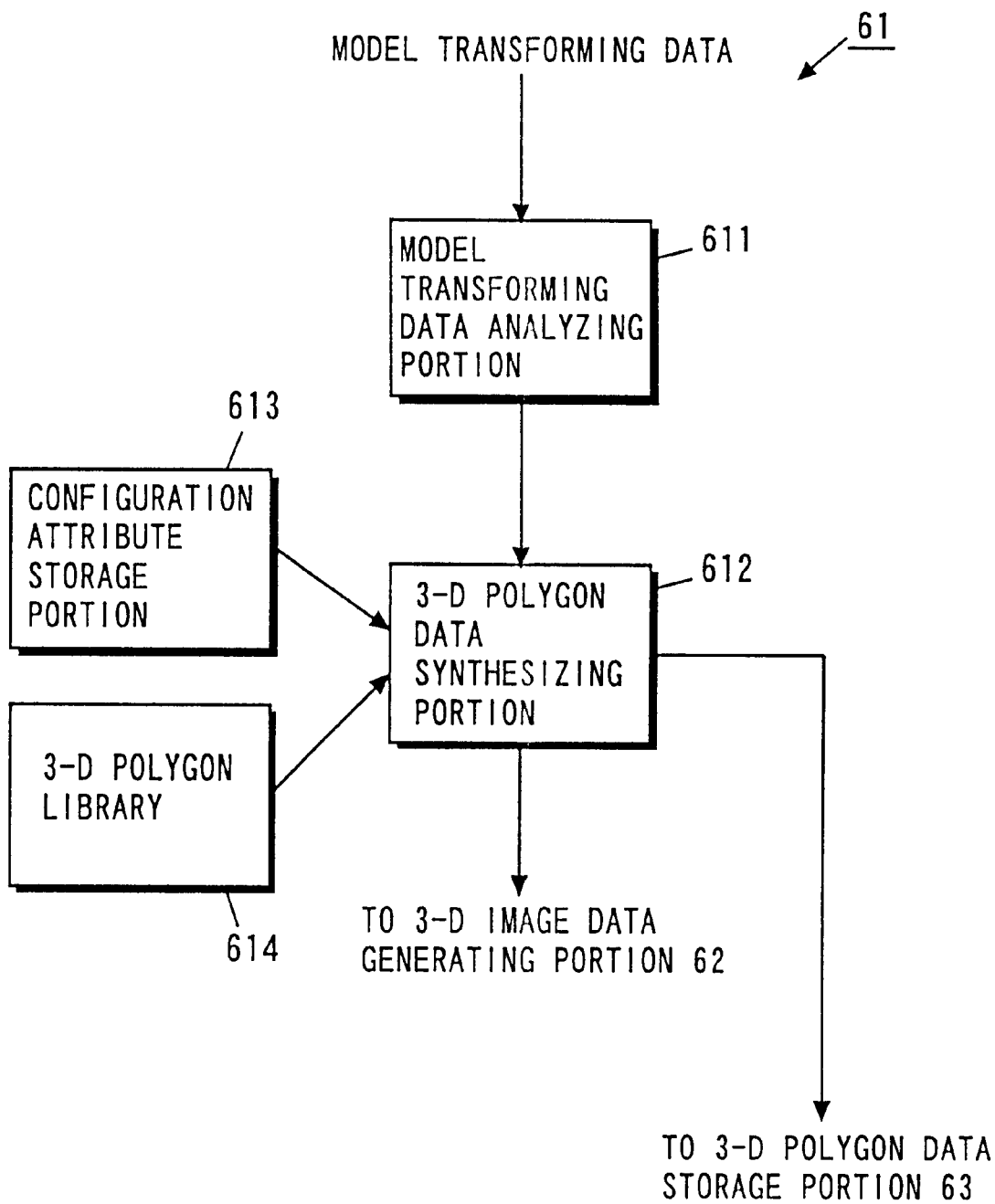

FIG. 28

| |
|---|
| [SUPPORTS]<br>SPACING BETWEEN SUPPORTS = 5.0 |
| [SAFETY WALL]<br>ROAD-WALL DISTANCE = 0.5<br>WALL WIDTH = 0.2<br>WALL HEIGHT = 2.0 |
| [TRAFFIC LIGHTS]<br>SIGNAL POLYGON FILE NAME = simplesignal<br>SIGNAL POLE HEIGHT = 4.0<br>SIGNAL SCALE FACTOR = 0.5<br>SET IN CENTER OF INTERSECTION = true |
| [BACKGROUND]<br>DEFAULT BACKGROUND TEXTURE FILE NAME<br>= green.bmp |
| [3-D WORLD SIZE]<br>GROUND WIDTH = 1000000<br>GROUND LENGTH = 1000000<br>GROUND THICKNESS = 10.0<br>GROUND LEVEL ABOVE SEA = -0.4 |
| [ROAD TEXTURE]<br>ROAD COLOR = GRAY |
| [ELEVATED-ROAD TEXTURE]<br>ELEVATED-ROAD COLOR = GRAY |
| [WALL TEXTURE]<br>WALL COLOR = GRAY |
| [SUPPORTS TEXTURE]<br>SUPPORTS COLOR = GRAY |
| [ROAD INFORMATION]<br>ROAD THICKNESS = 0.5<br>1-LANE WIDTH = 3.5 |
| [ELEVATED-ROAD INFORMATION]<br>1-LEVEL HEIGHT h = 3<br>FIRST-SECTION GRADE l1 = 2<br>SECOND-SECTION GRADE l2 = 6<br>THIRD-SECTION GRADE l3 = 2 |

| LINK NO. | LENGTH | WIDTH | CONFIGURATION PATTERN ||| HEIGHT | INTERSECTING ANGLE |
|---|---|---|---|---|---|---|---|
| | | | ROAD SHAPE | ELEVATED-ROAD SHAPE | CONNECTION SHAPE | | |
| 1 | 50 | 4 | 1 | | 1 ¦ a | | |
| 2 | 30 | 2 | | 1 | 1 ¦ c | 1 | 15° |
| 3 | 50 | 4 | 1 | | 1 ¦ a | | |
| 4 | 10 | 1 | 1 | 1 | 1 ¦ d | | |
| 5 | 10 | 1 | 1 | | 1 ¦ b | | |
| 6 | 10 | 1 | 1 | | 1 ¦ d | | |
| 7 | 10 | 1 | 1 | | 1 ¦ b | | |
| 8 | 50 | 2 | 1 | | | | |
| 9 | 30 | 2 | 1 | | | 0 | 15° |
| 10 | 50 | 2 | 1 | | | | |

MODEL TRANSFORMING DATA ANALYZING PORTION — 611

FUNC1 PARAMETERS

LENGTH = 50
WIDTH = 4

FUNCB1 PARAMETERS

LENGTH = 10
WIDTH = 1

TO 3-D POLYGON DATA SYNTHESIZING PORTION 612

TO 3-D POLYGON DATA SYNTHESIZING PORTION 612

F I G. 3 5

3-D POLYGON DATA B1

FROM 3-D POLYGON DATA SYNTHESIZING PORTION 612

| VERTEX NUMBER=16 | FACE NUMBER=14 |
|---|---|
| 1=(0,0,0) | f1=(1,2,10,9) |
| 2=(0,2,3) | f2=(2,3,11,10) |
| 3=(0,4,3) | f3=(3,4,12,11) |
| 4=(0,10,0) | f4=(9,10,14,13) |
| 5=(0,0,-0.5) | f5=(10,11,15,14) |
| 6=(0,2,2.5) | f6=(11,12,16,15) |
| 7=(0,4,2.5) | f7=(5,6,14,13) |
| 8=(0,10,-0.5) | f8=(6,7,15,14) |
| 9=(3.5,0,0) | f9=(7,8,16,15) |
| 10=(3.5,2,3) | f10=(1,2,6,5) |
| 11=(3.5,4,3) | f11=(2,3,7,6) |
| 12=(3.5,10,0) | f12=(3,4,8,7) |
| 13=(3.5,0,-0.5) | f13=(1,5,13,9) |
| 14=(3.5,2,2.5) | f14=(4,8,16,12) |
| 15=(3.5,4,2.5) | |
| 16=(3.5,10,-0.5) | material=(0.2,0.2,0.2) |

TO RENDERING PORTION 62

THREE-DIMENSIONAL MAP NAVIGATION DISPLAY DEVICE AND DEVICE FOR CREATING DATA USED THEREIN

This is a Divisional application of Ser. No. 09/319,864 filed Jun. 14, 1999 now U.S. Pat. No. 6,411,293 B1 which is a 371 of DCT/JP98/04853 filed Oct. 27, 1998

TECHNICAL FIELD

The present invention relates to three-dimensional map display devices, and more particularly to a device for simply displaying a three-dimensional configuration of a target area on a map.

BACKGROUND ART

A conventional car navigation system generally navigates along the route by displaying a two-dimensional map. In a case where a road is overlaying on another in parallel as shown on a display navigating a vicinity of freeway entrances and exits, however, a two-dimensional map without a longitudinal representation often puzzles a driver as to which way to go. Also, as to a multi-level intersection of a ordinary-type road to be navigated, when the display navigates to turn right after passing the multi-level intersection, it is difficult for the driver to instantaneously understand the navigated route as a conventional car navigation system does not represent the route stereoscopically.

Recently, various car navigation systems are being developed to display a map in a three-dimensional manner. Conventionally, when a map is three-dimensionally displayed, width and height information is manually provided to data about roads on a two-dimensional map in advance so as to generate three-dimensional polygon data from the map data having the information provided, and then the three-dimensional polygon data is stored in a map storage medium (CD-ROM, DVD, etc.). When a vehicle reaches a point to be navigated, a car navigation system in which this map storage medium is provided reads out corresponding three-dimensional polygon data from the map storage medium and displays a three-dimensional image.

The conventional system, however, requires width and height information to be added to every piece of road data on a two-dimensional map, which considerably complicates the processing. Further, it requires preparation such as measurements, and the like. Moreover, since two-dimensional map data contains a large amount of information which do not conform to the real-world road locations, an accuracy of a three-dimensional map obtained through such data on the two-dimensional map data is poor, which confuses the driver more. Information on road locations on a two-dimensional map may be corrected, or configuration data on a completed three-dimensional map may be corrected with a CAD tool, and the like in order to obtain a desired three-dimensional map. It will require a large number of additional processing steps. Further, since an accuracy of the conventional polygon automatic generating algorithm is poor, parts separated into small links and coupling/branching parts between two road links differing in width cannot be smoothly connected. That is to say, the polygon data does not coincide with the real-world road configuration, resulting in a reduction of the safety.

Moreover, in the conventional system, the three-dimensional polygon data itself is stored in a map storage medium (CD-ROM, DVD, etc.), and therefore the amount of map data to be stored is too large to three-dimensionally display many areas. To solve such an inconvenience, two-dimensional map data containing added width and height information may be stored in the map storage medium, in which case a car navigation system carried on a vehicle creates the three-dimensional polygon data. However, this method largely increases the load on a CPU of the car navigation system, resulting in another problem that the map cannot be scrolled at high speed.

Accordingly, an object of the present invention is to provide a three-dimensional map display method and a device which can easily and simply display the three-dimensional configuration of target areas on a map, with a largely reduced amount of data stored in a storage medium, and a device for creating data used in the method and device.

DISCLOSURE OF THE INVENTION

The present invention has the following features to achieve the object mentioned above.

A first aspect of the invention is directed to a device for creating model transforming data used to transform a three-dimensional map display model, wherein a three-dimensional configuration of a given part on a map is classified in advance into a plurality of patterns and a standard three-dimensional map display model is prepared for each pattern, and the model transforming data creating device comprises:

a two-dimensional map data storage portion for storing two-dimensional map data;

a parameter data extracting portion for extracting parameter data corresponding to the given part from the two-dimensional map data stored in the two-dimensional map data storage portion;

a parameter data analyzing portion for analyzing the parameter data extracted by the parameter data extracting portion to generate the model transforming data; and a storage portion for storing the model transforming data generated by the parameter data analyzing portion.

As stated above, according to the first aspect, instead of the three-dimensional image data itself, the model transforming data for transforming a previously prepared three-dimensional map display model into a desired form is generated as data for obtaining a three-dimensional image of a given part on a map, and then the data for three-dimensional map display can be provided in an extremely compressed form as compared with conventional ones.

According to a second aspect which depends on the first aspect, the model transforming data creating device further comprises a pattern model storage portion for storing pattern data defining sorts of parameters required when transforming the three-dimensional map display model for each pattern, wherein the parameter data analyzing portion comprises:
a pattern data reading portion for reading the pattern data corresponding to the given part from the pattern model storage portion; and
a data converting portion for converting the parameter data extracted by the parameter data extracting portion into the model transforming data on the basis of the pattern data read out by the pattern data reading portion.

As stated above, according to the second aspect, the parameter data is converted into the model transforming data on the basis of the pattern data, and more detailed model transforming data can be created as compared with the case in which the model transforming data is created from only the parameter data.

According to a third aspect which depends on the second aspect,
the pattern data reading portion comprises a pattern determining portion for determining the pattern on the basis of the parameter data extracted by the parameter data extracting portion and reading out the pattern data corresponding to the determined pattern from the pattern model storage portion.

As stated above, according to the third aspect, the parameter data can be automatically read from the parameter data storage portion without requiring manual operation.

According to a fourth aspect which depends on the third aspect,
the pattern determining portion comprises:
a branching part road attribute deciding portion for deciding attributes of roads around a branching point on the basis of the parameter data extracted by the parameter data extracting portion; and
a branch type deciding portion for deciding the type of the branching on the basis of the road attributes decided by the branching part road attribute deciding portion to determine the pattern.

As stated above, according to the fourth aspect, the pattern is determined according to the road attributes at a branching point especially requiring three-dimensional display, which enables pattern discrimination more conforming with the real-world road configuration.

According to a fifth aspect which depends on the fourth aspect,
the parameter data analyzing portion further comprises:
a parameter data classifying portion for classifying the parameter data according to road function on the basis of the pattern determined by the pattern determining portion; and
a data integrating portion for integrating the parameter data classified by the parameter data classifying portion within each classified group, and
the data converting portion converts the parameter data integrated by the data integrating portion into the model transforming data.

As stated above, according to the fifth aspect, not the mere parameter data extracted from the two-dimensional map data but the integrated parameter data is converted into the model transforming data, so that a three-dimensional map display model with a less number of connected portions can be adopted to provide a beautiful three-dimensional image, and the finally obtained three-dimensional image can be simplified on the basis of the road function to provide navigation display easy to understand for the user.

According to a sixth aspect which depends on the fifth aspect,
the parameter data classifying portion comprises:
a link tracing portion for tracing a desired link on the basis of the two-dimensional parameter data extracted by the two-dimensional parameter data extracting portion and temporarily storing and holding data of the traced link; and
a link data classifying portion for classifying the link data stored and held in the link tracing portion on the basis of the pattern determined by the pattern determining portion.

As stated above, according to the sixth aspect, the amount of parameter data as the source data for classification can be reduced depending on the condition for tracing links, and then the classifying operation can be performed at high speed.

According to a seventh aspect which depends on the second aspect,
the pattern data reading portion reads the pattern data corresponding to a pattern indicated by an operator from the pattern data storage portion.

According to an eighth aspect which depends on the second aspect,
the data converting portion obtains values of part of the parameters defined by the pattern data read by the pattern data reading portion directly from the parameter data extracted by the parameter data extracting portion and obtains remaining parameter values by inference processing.

As stated above, according to the eighth aspect, parameters wanting when generating the model transforming data can be automatically obtained by inference.

According to a ninth aspect which depends on the second aspect,
the data converting portion obtains values of part of the parameters defined by the pattern data read by the pattern data reading portion directly from the parameter data extracted by the parameter data extracting portion and obtains remaining parameter values through an instruction from an operator.

According to a tenth aspect which depends on the first aspect,
the model transforming data creating device further comprises:
an image data generating portion for generating three-dimensional image data by applying the model transforming data generated by the parameter data analyzing portion to the corresponding three-dimensional map display model and transforming the three-dimensional map display model; and
a display portion for displaying the three-dimensional configuration of the given part on the basis of the three-dimensional image data generated by the image data generating portion.

As stated above, according to the tenth aspect, since the three-dimensional configuration obtained on the basis of the generated model transforming data is displayed in a real-time manner, it is easy to see whether desired model transforming data has been obtained.

According to an eleventh aspect which depends on the tenth aspect,
the model transforming data creating device further comprises a model transforming data correcting portion for correcting the model transforming data generated by the parameter data analyzing portion in response to an instruction from an operator.

As stated above, according to the eleventh aspect, the model transforming data can be corrected and the corrected three-dimensional configuration can be displayed, and thus the correcting operation can be achieved easily.

According to a twelfth aspect which depends on the first aspect,
the parameter data extracting portion extracts the parameter data of a part indicated by an operator from the two-dimensional map data.

According to a thirteenth aspect which depends on the first, aspect,
the parameter data extracting portion extracts the parameter data of a part which conforms with a previously set condition from the two-dimensional map data.

As stated above, according to the thirteenth aspect, the part to be three-dimensionally displayed on a map can be automatically specified to extract parameters.

According to a fourteenth aspect, a device for creating three-dimensional polygon data used to display a three-dimensional configuration of a given part on a map comprises:

a two-dimensional map data storage portion for storing two-dimensional map data;

a parameter data extracting portion for extracting parameter data corresponding to the given part from the two-dimensional map data stored in the two-dimensional map data storage portion;

a parameter data analyzing portion for analyzing the parameter data extracted by the parameter data extracting portion to generate model transforming data;

a three-dimensional polygon data generating portion for generating the three-dimensional polygon data by applying the model transforming data generated by the parameter data analyzing portion to a corresponding three-dimensional map display model to transform the three-dimensional map display model; and a three-dimensional polygon data storage portion for storing the three-dimensional polygon data generated by the three-dimensional polygon data generating portion.

As stated above, according to the fourteenth aspect, the three-dimensional polygon data is obtained by transforming a previously prepared three-dimensional map display model, so that the computation for generating the three-dimensional polygon data can be simplified.

According to a fifteenth aspect, a device for creating three-dimensional image data used to display a three-dimensional configuration of a given part on a map comprises:

a two-dimensional map data storage portion for storing two-dimensional map data;

a parameter data extracting portion for extracting parameter data corresponding to the given part from the two-dimensional map data stored in the two-dimensional map data storage portion;

a parameter data analyzing portion for analyzing the parameter data extracted by the parameter data extracting portion to generate model transforming data;

a three-dimensional polygon data generating portion for generating three-dimensional polygon data by applying the model transforming data generated by the parameter data analyzing portion to a corresponding three-dimensional map display model to transform the three-dimensional map display model;

a three-dimensional image data generating portion for generating the three-dimensional image data on the basis of the three-dimensional polygon data generated by the three-dimensional polygon data generating portion; and a three-dimensional image data storage portion for storing the three-dimensional image data generated by the three-dimensional image data generating portion.

As stated above, according to the fifteenth aspect, the three-dimensional image data is generated from the three-dimensional polygon data obtained by transforming a previously prepared three-dimensional map display model, so that the computation for generating the three-dimensional image data can be simplified.

sixteenth aspect is directed to a three-dimensional map display device for displaying a three-dimensional configuration of a given part on a map, wherein the three-dimensional configuration of the given part on the map is classified in advance into a plurality of patterns and a standard three-dimensional map display model is prepared for each pattern, and the three-dimensional map display device comprises:

a two-dimensional map data storage portion for storing two-dimensional map data;

a parameter data extracting portion for extracting parameter data corresponding to the given part from the two-dimensional map data stored in the two-dimensional map data storage portion;

a parameter data analyzing portion for analyzing the parameter data extracted by the parameter data extracting portion to generate model transforming data used to transform the three-dimensional map display model;

an image data generating portion for generating three-dimensional image data by applying the model transforming data generated by the parameter data analyzing portion to the corresponding three-dimensional map display model to transform the three-dimensional map display model into a desired form; and a display portion for displaying the three-dimensional configuration of the given part on the basis of the three-dimensional image data generated by the image data generating portion;

a parameter data analyzing portion for analyzing the parameter data extracted by the parameter data extracting portion to generate model transforming data used to transform the three-dimensional map display model;

an image data generating portion for generating three-dimensional image data by applying the model transforming data generated by the parameter data analyzing portion to the corresponding three-dimensional map display model to transform the three-dimensional map display model into a desired form; and a display portion for displaying the three-dimensional configuration of the given part on the basis of the three-dimensional image data generated by the image data generating portion.

As stated above, according to the sixteenth aspect, the map configuration is classified into a plurality of patterns and a standard three-dimensional map display model prepared for each pattern is transformed to obtain a three-dimensional image, which enables three-dimensional display more fitted to the object of the navigation (that is to say, to enable clear understanding of the correspondence between real-world roads and navigated routes) as compared with the conventional system in which a three-dimensional image is obtained directly from two-dimensional map data with added width and height information. That is to say, according to the sixteenth aspect, the basic configuration of roads is previously prepared in the form of a three-dimensional map display model, and therefore the relation among roads, such as how roads are connected to one another or branched, is not largely changed even when the three-dimensional map display model is largely transformed. Accordingly, errors in some degrees existing on the two-dimensional map data are automatically corrected at the time when the pattern of the specified road part is determined, which reduces a possibility of displaying errors far apart from the original object of the navigation. Also, according to the sixteenth aspect, it is not necessary to perform all the steps for calculating and generating the three-dimensional image data, but it can be generated by just performing the calculation of transforming a previously defined three-dimensional map display model on the basis of the model transforming data, and the amount of calculation can be largely reduced as compared with conventional case. This enables high-speed picture drawing processing. Further, according to the sixteenth aspect, since the model transforming data is generated within the three-dimensional map display device, the map storage medium can be used to store the two-dimensional map data only, and the device can work with almost the same amount of previously stored map data as a conventional map display device displaying a two-dimensional map.

According to a seventeenth aspect which depends on the sixteenth aspect, the three-dimensional map display device further comprises a pattern model storage portion for storing pattern data defining sorts of parameters required when transforming the three-dimensional map display model for each pattern, and the parameter data analyzing portion comprises:
  a pattern data reading portion for reading out the pattern data corresponding to the given part from the pattern model storage portion; and
  a data converting portion for converting the parameter data extracted by the parameter data extracting portion into the model transforming data on the basis of the pattern data read by the pattern data reading portion.

As stated above, according to the seventeenth aspect, the parameter data is converted into the model transforming data on the basis of the pattern data, and more detailed model transforming data can thus be created as compared with a case in which the model transforming data is created from only the parameter data.

According to an eighteenth aspect which depends on the seventeenth aspect, the pattern data reading portion comprises a pattern determining portion for determining the pattern on the basis of the parameter data extracted by the parameter data extracting portion and reading out the pattern data corresponding to the determined pattern from the pattern model storage portion.

As stated above, according to the eighteenth aspect, the parameter data can be automatically read out from the parameter data storage portion without through manual operation.

According to a nineteenth aspect which depends on the eighteenth aspect, the pattern determining portion comprises:
  a branching part road attribute deciding portion for deciding attributes of roads around a branching point on the basis of the parameter data extracted by the parameter data extracting portion; and
  a branch type deciding portion for deciding the type of the branching on the basis of the road attributes decided by the branching part road attribute deciding portion to determine the pattern.

As stated above, according to the nineteenth aspect, the pattern is determined in accordance with road attributes at a branching point especially requiring three-dimensional display, so that the pattern can be determined in a manner more fitted to the real-world road configuration.

According to a twentieth aspect which depends on the nineteenth aspect, the parameter data analyzing portion further comprises:
  a parameter data classifying portion for classifying the parameter data according to road function on the basis of the pattern determined by the pattern determining portion; and
  a data integrating portion for integrating the parameter data classified by the parameter data classifying portion within each classified group; and the data converting portion converts the parameter data integrated by the data integrating portion into the model transforming data.

As stated above, according to the twentieth aspect, not the mere parameter data extracted from the two-dimensional map data but the integrated parameter data is converted into the model transforming data, so that a three-dimensional map display model with a less number of connected portions can be adopted to provide a beautiful three-dimensional image, and the finally obtained three-dimensional image can be simplified on the basis of road function to provide navigation display easy to understand for the user.

According to a twenty-first aspect which depends on the twentieth aspect, the parameter data classifying portion comprises:
  a link tracing portion for tracing a desired link on the basis of the two-dimensional parameter data extracted by the two-dimensional parameter data extracting portion and temporarily storing and holding data of the traced link; and
  a link data classifying portion for classifying the link data stored and held in the link tracing portion on the basis of the pattern determined by the pattern determining portion.

As stated above, according to the twenty-first aspect, the amount of the parameter data as the source data for classification can be reduced depending on the condition used when tracing links, and the computation for classification can be performed at high speed.

According to a twenty-second aspect which depends on the seventeenth aspect, the data converting portion obtains values of part of the parameters defined by the pattern data read by the pattern data reading portion directly from the parameter data extracted by the parameter data extracting portion and obtains remaining parameter values by inference.

As stated above, according to the twenty-second aspect, parameters wanting in generating the model transforming data can be automatically obtained by inference.

According to a twenty-third aspect which depends on the twenty-second aspect, the three-dimensional map display device is installed in a car navigation device for navigating a vehicle on the map.

A twenty-fourth aspect is directed to a three-dimensional map display device for displaying a three-dimensional configuration of a given part on a map, wherein the three-dimensional configuration of the given part on the map is classified in advance into a plurality of patterns and a standard three-dimensional map display model is prepared for each pattern, and the three-dimensional map display device comprises:

a model transforming data storage portion for storing model transforming data for transforming the three-dimensional map display model;

an image data generating portion for generating three-dimensional image data by reading out the model transforming data corresponding to the given part and applying the model transforming data to the corresponding three-dimensional map display model to transform the three-dimensional map display model into a desired form; and a display portion for displaying the three-dimensional configuration of the given part on the basis of the three-dimensional image data generated by the image data generating portion.

As stated above, according to the twenty-fourth aspect, the map configuration is classified into a plurality of patterns and a standard three-dimensional map display model prepared for each pattern is transformed to obtain a three-dimensional image, which enables three-dimensional display more fitted to the object of the navigation (that is to say, to understand a correspondence between real-world roads and navigated routes in a clear manner) as compared with the conventional system in which a three-dimensional image is obtained directly from two-dimensional map data with added width and height information. That is to say, according to the twenty-fourth aspect, the basic configuration of roads is previously prepared as a three-dimensional map display model, and therefore the relation among roads, such as how roads are connected to one another or branched, is not largely changed even when the three-dimensional map display model is largely transformed. Accordingly, errors in some degrees existing on the two-dimensional map data are automatically corrected at the time when the pattern of the specified road part is determined, which reduces a probability of displaying errors far apart from the original object of the navigation. Also, according to the twenty-fourth aspect, it is not necessary to perform all the steps for calculating and generating the three-dimensional image data, but it can be generated by just performing the calculation of transforming a previously defined three-dimensional map display model on the basis of the model transforming data, and the amount of calculation can be largely reduced as compared with a conventional case. This enables high-speed picture drawing processing. Further, according to the twenty-fourth aspect, the device stores the model transforming data extremely compressed as compared with the three-dimensional polygon data and three-dimensional image data, so that the amount of previously stored map data (data required to display a three-dimensional map) can be considerably reduced, as compared with a conventional map display device displaying a three-dimensional map.

According to a twenty-fifth aspect which depends on the twenty-fourth aspect, the three-dimensional map display device is installed in a car navigation device for navigating a vehicle on the map.

A twenty-sixth aspect is directed to a method for displaying a three-dimensional configuration of a given part on two-dimensional map data, the method comprising the steps of:

classifying in advance the three-dimensional configuration of the given part into a plurality of patterns and preparing in advance a standard three-dimensional map display model for each pattern;

extracting parameter data corresponding to the given part from the two-dimensional map data;

generating model transforming data from the extracted parameter data; and applying the model transforming data to the corresponding three-dimensional map display model to transform the three-dimensional map display model into a desired form, thereby obtaining a three-dimensional image of the given part.

As stated above, according to the twenty-sixth aspect, the map configuration is classified into a plurality of patterns and a standard three-dimensional map display model prepared for each pattern is transformed to obtain a three-dimensional image, which enables three-dimensional display more fitted to the object of the navigation (that is to say, to understand a correspondence between real-world roads and navigated roads in a clear manner) as compared with the conventional system in which a three-dimensional image is obtained directly from two-dimensional map data with added width and height information. That is to say, according to the twenty-sixth aspect, the basic configuration of roads is previously prepared as a three-dimensional map display model and therefore the relation among roads, such as the configuration of connections and branches of roads, is not largely changed even when the three-dimensional map display model is largely transformed. Accordingly, errors in some degrees existing on the two-dimensional map data are automatically corrected at the time when the pattern of the specified road part is determined, which reduces a possibility of displaying errors far apart from the original object of the navigation. Also, according to the twenty-sixth aspect, it is not necessary to perform all the steps for calculating and generating the three-dimensional image data, but it can be generated by just performing the calculation of transforming a previously defined three-dimensional map display model on the basis of the model transforming data, and the amount of calculation can be largely reduced as compared with conventional devices. This enables high-speed picture drawing processing.

A twenty-seventh aspect is directed to a storage medium used in a three-dimensional map display device in which a three-dimensional configuration of a given part on two-dimensional map data is classified in advance into a plurality of patterns and a standard three-dimensional map display model is prepared in advance for each pattern, and the three-dimensional map display model is transformed into a desired form to generate and display three-dimensional image data of the given part, wherein the storage medium contains model transforming data for transforming the three-dimensional map display model into the desired form in correspondence with each road part to be three-dimensionally displayed.

As stated above, according to the twenty-seventh aspect, data for three-dimensional map display can be stored in an extremely compressed form.

BRIEF DESCRIPTION OF THE DRAWINGS

FIG. 5 is a diagram showing an example of two-dimensional parameter data extracted from two-dimensional map data.

FIG. 12 is a diagram showing an example of pattern data stored in the pattern model storage portion 5 of FIG. 1.

FIG. 13 is a diagram showing an example of parameter data classified according to road function.

FIG. 16 is a diagram showing an example of results obtained by tracing links.

FIG. 17 is a diagram showing an example of results obtained by storing the link data of the traced links.

FIG. 18 is a diagram showing an example of results obtained by classifying the links according to road function.

FIG. 19 is a diagram showing an example of parameter data generated by integrating the classified data.

FIG. 21 is a diagram showing an example of pattern data in which parameters are set (model transforming data).

FIG. 27 is a block diagram showing the more detailed structure of the three-dimensional polygon data generating portion 61 shown in FIG. 26.

FIG. 28 is a diagram showing an example of contents of parameters and default values thereof stored in the configuration attribute storage portion 613 of FIG. 27.

FIG. 35 is a diagram showing an example of results obtained by the processing of the function FUNCB1.

BEST MODE FOR CARRYING OUT THE INVENTION

Figure 1:
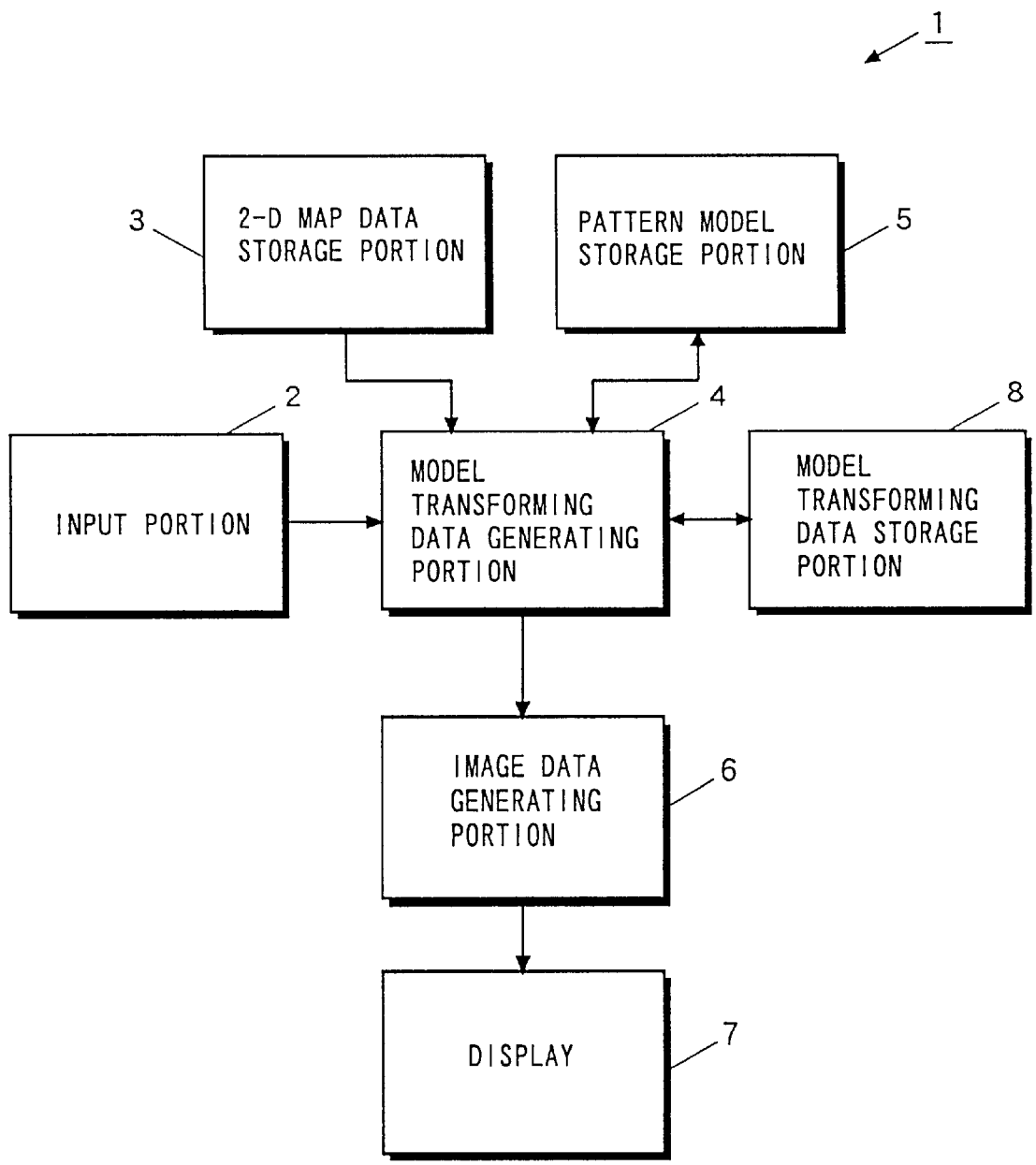
FIG. 1 is a block diagram showing the structure of a model transforming data creating device according to an embodiment of the present invention.

Before describing embodiments of the present invention in detail, the basic idea of the present invention will now be described to facilitate understanding of the invention.

The present invention was made to enable three-dimensional display of a given road area on a map. As is well known for a conventional car navigation system of a general type, when a navigated route comes closer to a junction or a point to turn right or left, configurations of roads around the point are displayed in an enlarged manner. A typical application of the present invention is to three-dimensionally display the enlarged configurations. The present invention is also applicable to a system in which navigated roads are all three-dimensionally displayed.

In the present invention, configuration of roads to be three-dimensionally displayed are previously classified into some patterns each including similar types. For example, configurations of roads are classified into a multi-level intersection, underpass, junction, elevated road, freeway, and the like. The present invention previously prepares a standard three-dimensional map display model for each of the classified patterns, and creates model transforming data from parameters extracted from two-dimensional map data and transforms the corresponding three-dimensional map display model into desired form by applying the model transforming data. Thus, a three-dimensional image corresponding to the given road area is obtained.

Since a conventional system obtains a three-dimensional image by handling two-dimensional map data containing additional width and height information as three-dimensional coordinate data, it completely neglects how the roads are connected to one another or branched. Accordingly, when the two-dimensional map data contains errors, the errors are directly incorporated into the three-dimensional image. For example, an elevated road may be discontinued halfway or branched roads running in parallel may be largely curved.

On the other hand, the present invention previously classifies road configurations into a plurality of patterns, prepares a standard three-dimensional map display model for the individual patterns, and transforms the three-dimensional map display models to obtain three-dimensional images, which enables three-dimensional display more fitted to the original object of the car navigation (that is to say, to understand a correspondence between real-world roads and a navigated route in a clear manner) as compared with the conventional system in which three-dimensional image is obtained directly from two-dimensional map data having width and height information added. That is, in the present invention, basic configurations of roads are previously prepared in the form of three-dimensional map display models in a three-dimensional image data generating algorithm, and therefore basic relation among roads, i.e., how the roads are connected to one another or branched, is not largely changed even when the three-dimensional map display models are largely transformed. Accordingly, errors in some degrees existing on the two-dimensional map data are automatically corrected when a configuration of a road to be three-dimensionally displayed is determined to which pattern it belongs, which reduces a probability of displaying errors far apart from the original object of the navigation system.

On the other hand, since the present invention three-dimensionally displays the map configuration in deformed (simplified or exaggerated) manner, the displayed three-dimensional image does not completely conform with the real-world road configuration, unlike the conventional system in which two-dimensional map data having width and height information added is handled as three-dimensional coordinate data. In other words, as compared with the conventional system, the present invention displays a three-dimensional map in a form closer to animated cartoon. However, when a vehicle is navigated, it is not necessary that the displayed three-dimensional map completely corresponds to the real-world road configuration. In car-navigation, no problem arises even if the angles of slopes of elevated roads and scales of roads differ from the actual values. The object of the car-navigation can be achieved if the display can show whether roads are rising or descending and how many lanes they have, at least. That is to say, the object of car-navigation can be achieved if the display shows enough information for a driver to clearly understand the correspondence between real-world roads and the displayed navigation, such as the configuration of branching roads, vertical relation between roads. Accordingly, just transforming a previously prepared three-dimensional map display model can sufficiently achieve the object of the car-navigation. Conversely, such deformed display as is made in the present invention is easier for the driver to understand.

As stated above, it is not necessary to accurately transform prepared three-dimensional map display models so as to completely correspond to the real-world road configuration, and the object of the navigation can be achieved by transforming the three-dimensional map display models to such an extent that the object of the car-navigation is not impeded. This means that the number of parameters given to the three-dimensional map display models can be reduced. Further, when the present invention is applied to a car navigation system, not the three-dimensional image data itself but only the model transforming data for transforming the three-dimensional map display models is stored in the map storage medium provided in the car navigation system with respect to the road area to be three-dimensionally displayed. That is to say, data for three-dimensional display can be stored in a highly compressed form in the map storage medium, resulted in an extremely reduced amount of data. Further, when only the two-dimensional map data is stored in the map storage medium and the car navigation system generates model transforming data on the basis of the two-dimensional map data, the amount of data additionally stored in the map storage medium can be almost zero.

Moreover, the present invention can considerably simplify a structure for processing in the algorithm for generating the three-dimensional image data on the basis of model transforming data (hereinafter referred to as a three-dimensional image data generating algorithm). This is because the three-dimensional image data generating algorithm does not have to perform all the steps for calculating and generating three-dimensional image data, but it performs only the computation for transforming the previously defined three-dimensional map display models.

It is noted that the basic idea was described above only to facilitate understanding of the present invention, and it should not be used to improperly limit the scope of the invention.

Description of the Specific Embodiments

FIG. 1 is a block diagram showing the structure of a model transforming data creating device of an embodiment of the present invention. In FIG. 1, the model transforming data creating device 1 of this embodiment includes an input portion 2, a two-dimensional map data storage portion 3, a model transforming data generating portion 4, a pattern model storage portion 5, an image data generating portion 6, a display 7, and a model transforming data storage portion 8.

The input portion 2 includes a cross-shaped pad, a mouse, a keyboard, and the like, which is operated by an operator to enter the map number, information for specifying a road area to be three-dimensionally displayed, data for correcting parameters, pattern number of a pattern model, and the like. The two-dimensional map data storage portion 3 is composed of a large-capacity storage device containing a storage medium such as a CD-ROM or DVD, which is used to store two-dimensional map data. The model transforming data generating portion 4 generates model transforming data required when transforming the three-dimensional map display model on the basis of information entered from the input portion 2, two-dimensional map data read out from the two-dimensional map data storage portion 3, and pattern data read out from the pattern model storage portion 5. The pattern model storage portion 5 contains pattern data defining sorts of parameters required when transforming each three-dimensional map display model. The image data generating portion 6 contains a three-dimensional image data generating algorithm, which generates three-dimensional image data on the basis of the model transforming data generated in the model transforming data generating portion 4. The display 7 displays three-dimensional configuration of a specified road area on the basis of the three-dimensional image data generated in the image data generating portion 6. The model transforming data storage portion 8 is used to store model transforming data generated in the model transforming data generating portion 4.

Figure 2:
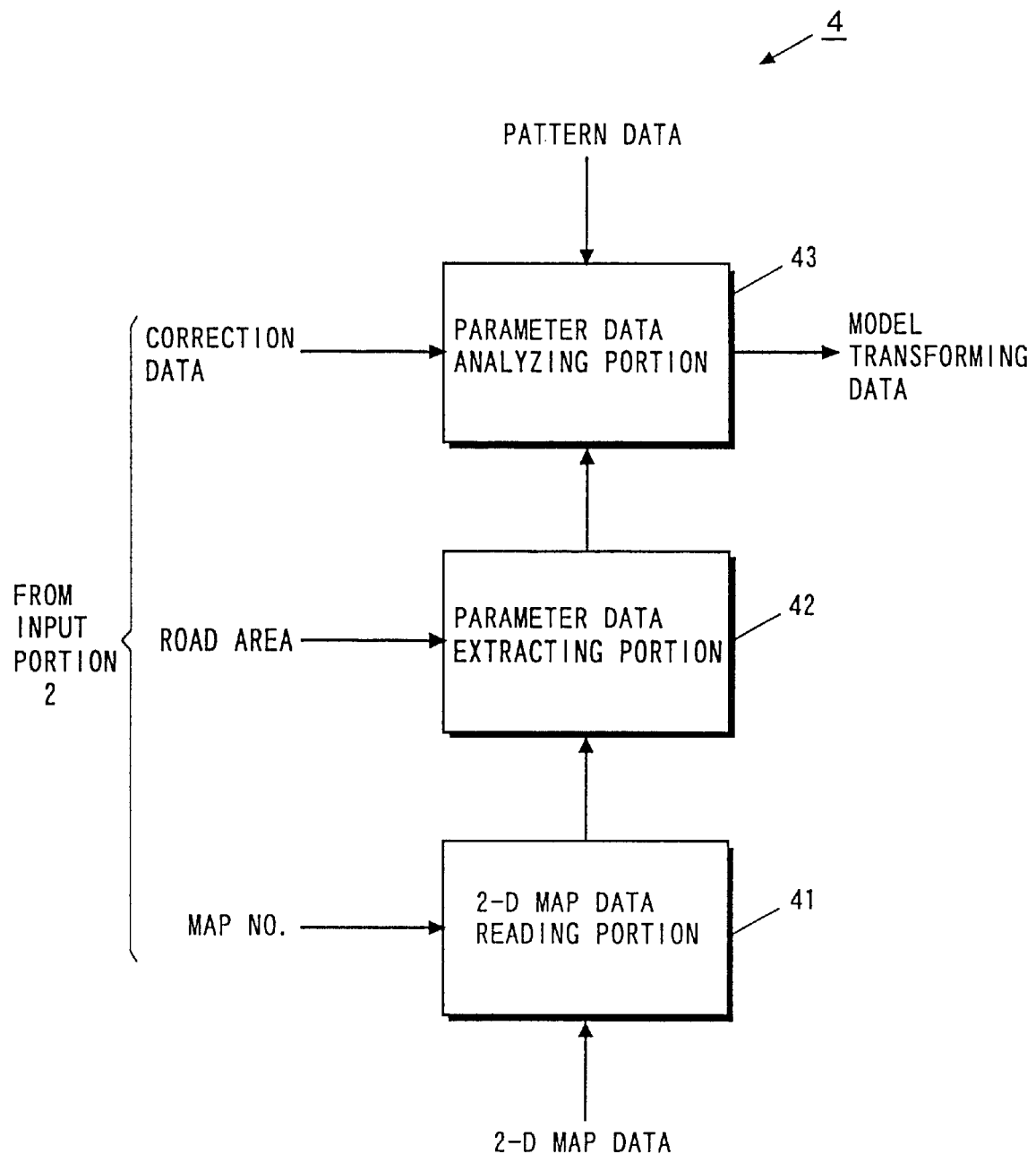
FIG. 2 is a block diagram showing the more detailed structure of the model transforming data generating portion 4 shown in FIG. 1.

FIG. 2 is a block diagram showing the details of the structure of the model transforming data generating portion 4 shown in FIG. 1. In FIG. 2, the model transforming data generating portion 4 includes a two-dimensional map data reading portion 41, a parameter data extracting portion 42, and a parameter data analyzing portion 43.

The two-dimensional map data reading portion 41 reads two-dimensional map data for an area corresponding to a map number entered from the input portion 2 from the two-dimensional map data storage portion 3. The parameter data extracting portion 42 extracts parameter data indicating attributes of each link from the two-dimensional map data read by the two-dimensional map data reading portion 41. The parameter data analyzing portion 43 analyzes the parameter data extracted by the parameter data extracting portion 42 and reads required pattern data from the pattern model storage portion 5 and generates the model transforming data for transforming the three-dimensional map display model.

The model transforming data generated in the parameter data analyzing portion 43 is given to the image data generating portion 6 and converted into three-dimensional image data, and the display 7 displays the corresponding three-dimensional configuration. The operator checks the contents displayed on the display 7 to see whether a correct three-dimensional image is displayed. When the three-dimensional image is to be corrected, parameters for change or addition are entered from the input portion 2. This changes the contents of the model transforming data generated in the parameter data analyzing portion 43 and the displayed contents on the display 7 change accordingly. When the three-dimensional image displayed on the display 7 has been changed to the form desired by the operator, the model transforming data generated in the parameter data analyzing portion 43 is stored in the model transforming data storage portion 8.

Figure 3:
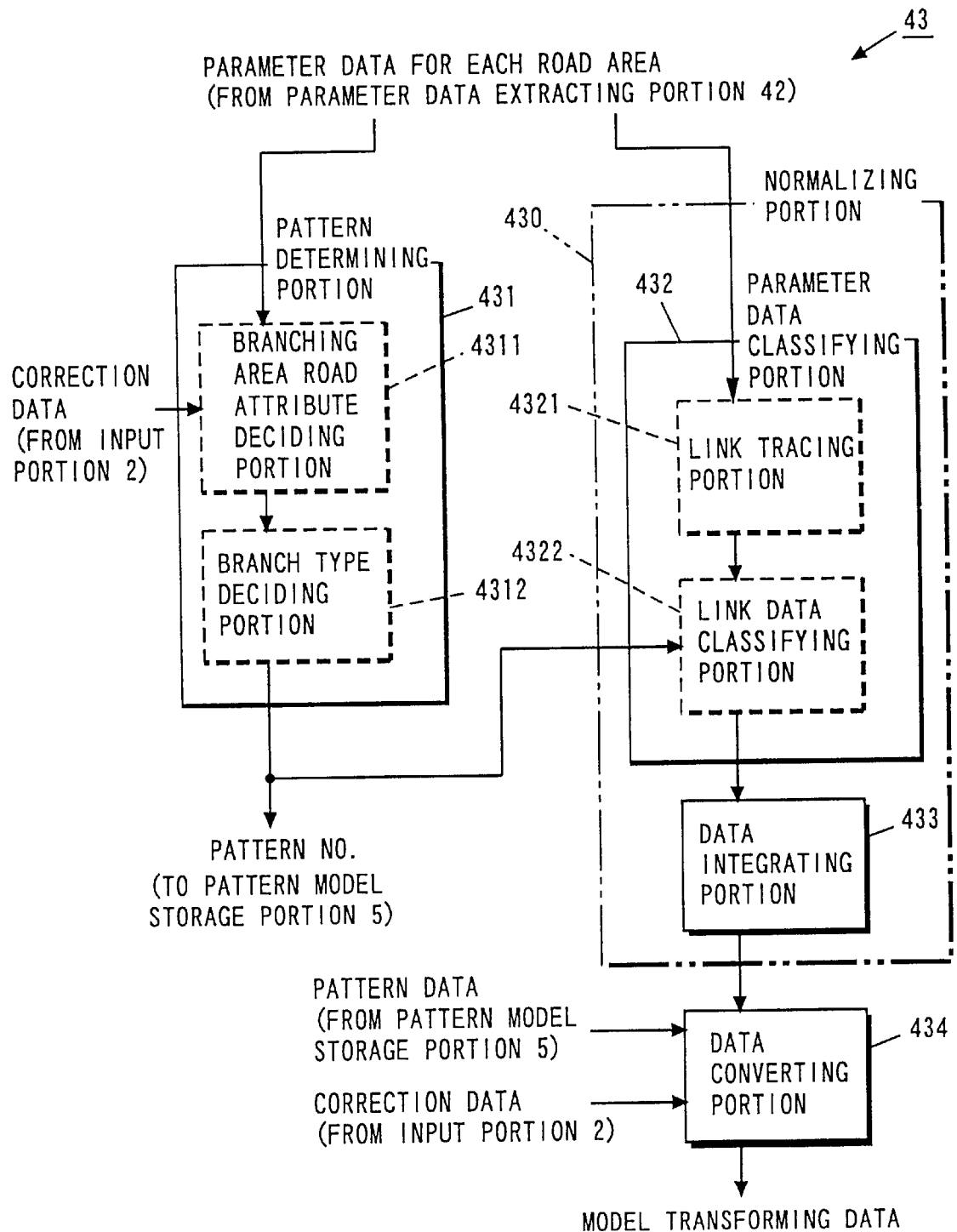
FIG. 3 is a block diagram showing the more detailed structure of the parameter data analyzing portion 43 shown in FIG. 2.

FIG. 3 is a block diagram showing the greater details of the structure of the parameter data analyzing portion 43 shown in FIG. 2. In FIG. 3, the parameter data analyzing portion 43 includes a pattern determining portion 431, a parameter data classifying portion 432, a data integrating portion 433, and a data converting portion 434.

The pattern determining portion 431 determines a pattern of road configuration to be adopted, on the basis of the parameter data on the road area extracted by the parameter data extracting portion 42. The parameter data classifying portion 432 classifies the parameter data of each road area on the basis of the pattern determined by the pattern determining portion 431, in accordance with characteristic parts of the intersection pattern, such as elevated road, side pass, etc. The data integrating portion 433 integrates the parameter data classified according to the road function by the parameter data classifying portion 432 for each road function to generate normalized parameter data. The parameter data classifying portion 432 and the data integrating portion 433 form a normalizing portion 430 for normalizing the parameter data. The data converting portion 434 converts the normalized parameter data outputted from the data integrating portion 433 into model transforming data on the basis of the pattern data read out from the pattern model storage portion 5.

For more details of the structure of the pattern determining portion 431, the pattern determining portion 431 includes a branching area road attribute deciding portion 4311 and a branch type deciding portion 4312. The branching area road attribute deciding portion 4311 decides attributes of all roads connected to a branching point on the basis of the parameter data extracted by the parameter data extracting portion 42. The attribute of roads represents the height of the roads from the ground, which shows the configuration of the object road, i.e., elevated road, underpass, or a road on the ground. The branch type deciding portion 4312 detects a combination of the attributes of the roads connected to the branching point on the basis of the attributes of the roads decided by the branching area road attribute deciding portion 4311 to determine the type of the branching. The branch type deciding portion 4312 then decides a pattern of the three-dimensional map display model to be used from the determined type of the branching and outputs a corresponding pattern number.

For the details of the structure of the parameter data classifying portion 432, the parameter data classifying portion 432 includes a link tracing portion 4321 and a link data classifying portion 4322. The link tracing portion 4321 traces a two-dimensional map network on the basis of the parameter data extracted by the parameter data extracting portion 42. When tracing the map network, link data of the three-dimensioned area is stored by utilizing the attribute, type, angle, area, and the like in the map data as criteria. The link data classifying portion 4322 classifies the link data stored in the link tracing portion 4321 for each road area and associates each part of the three-dimensional map display model and the two-dimensional map network.

Figure 4:
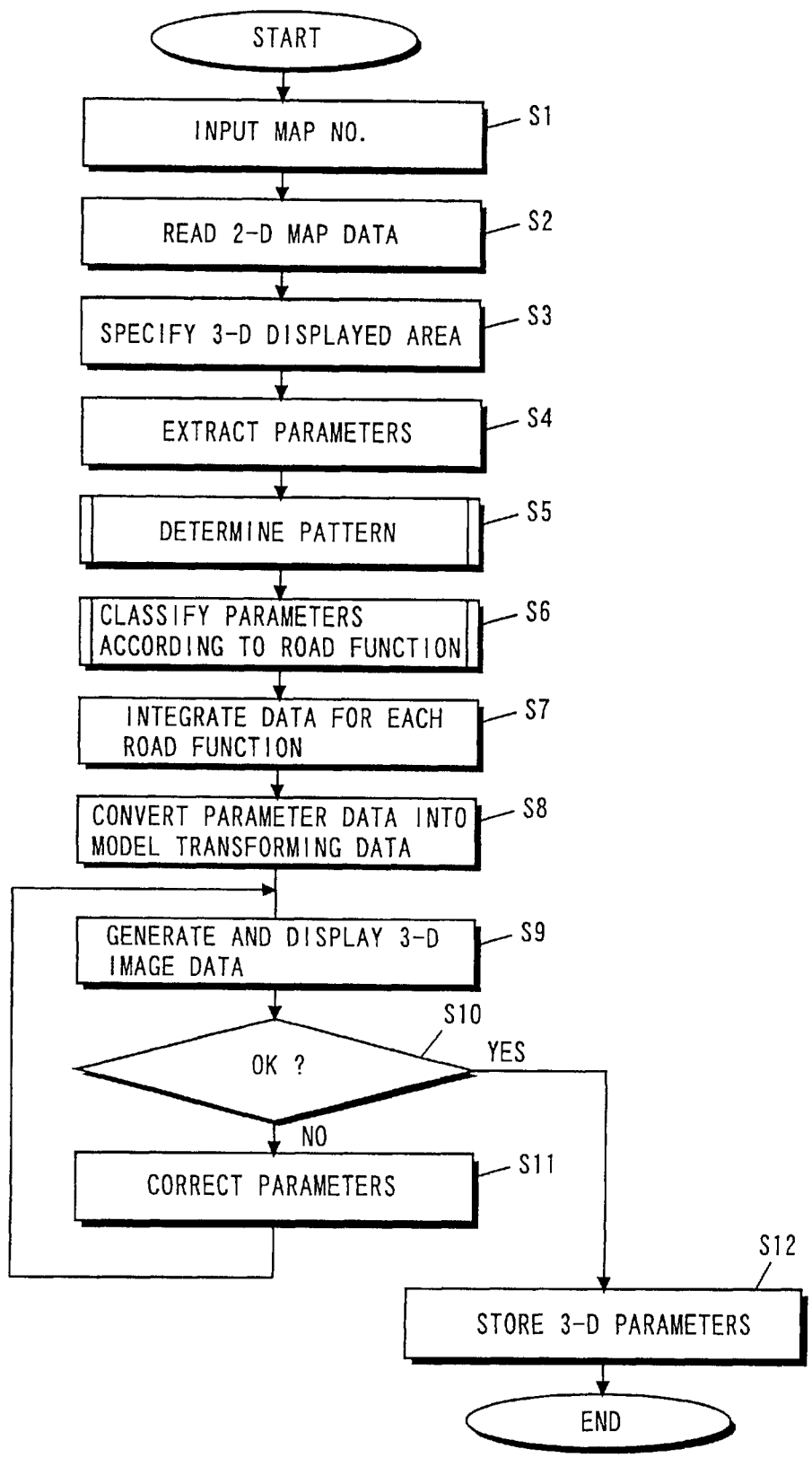
FIG. 4 is a flowchart used to explain the operation of the model transforming data creating device 1 shown in FIG. 1.

FIG. 4 is a flowchart showing the entire operation of the model transforming data creating device 1 shown in FIGS. 1 to 3. Referring to FIG. 4, the operation of the model transforming data creating device 1 will now be described.

First, a map number including a road area to be three-dimensionally displayed is entered to the model transforming data generating portion 4 from the input portion 2 (step S1). This embodiment adopts DRMA (Digital Road Map) for a format of the two-dimensional map data stored in the two-dimensional map data storage portion 3. In the DRMA, a map of the whole country is divided into a plurality of areas according to a given unit (e.g., secondary mesh unit). The two-dimensional map data reading portion 41 in the model transforming data generating portion 4 reads out the two-dimensional map data for an area corresponding to the map number entered from the input portion 2, from the two-dimensional map data storage portion 3 (step S2).

Next, the model transforming data generating portion 4 specifies a road area (e.g., a multi-level intersection) to be three-dimensionally displayed from the two-dimensional map data read out from the two-dimensional map data storage portion 3 (step S3). The operation of specifying the road area may be performed on the basis of specifying data entered from the input portion 2 (the former case) or may be performed according to an algorithm for automatically specifying the road area (the latter case). In the former case, the image data generating portion 6 creates image data on the two-dimensional map corresponding to the two-dimensional map data read out from the two-dimensional map data storage portion 3 and displays it on the display 7. The operator draws a box, for example, around a part to be displayed in a three-dimensional manner on the two-dimensional map (or enlarged map thereof) displayed on the display 7 so as to specify a road area. At this time, the input portion 2 outputs specifying data indicating the road area specified by the operator to the model transforming data generating portion 4. In response, the parameter data extracting portion 42 in the model transforming data generating portion 4 extracts parameter data for the area corresponding to the specifying data entered from the input portion 2 from the two-dimensional map data (step S4). In the latter case, the parameter data extracting portion 42 in the model transforming data generating portion 4 searches for a road area conforming with previously set conditions on the two-dimensional map data read from the two-dimensional map data storage means 3 and extracts the parameter data in the vicinity of the found road area (e.g., in the area within a 500-m radius) from the two-dimensional map data (step S4).

Figure 6:
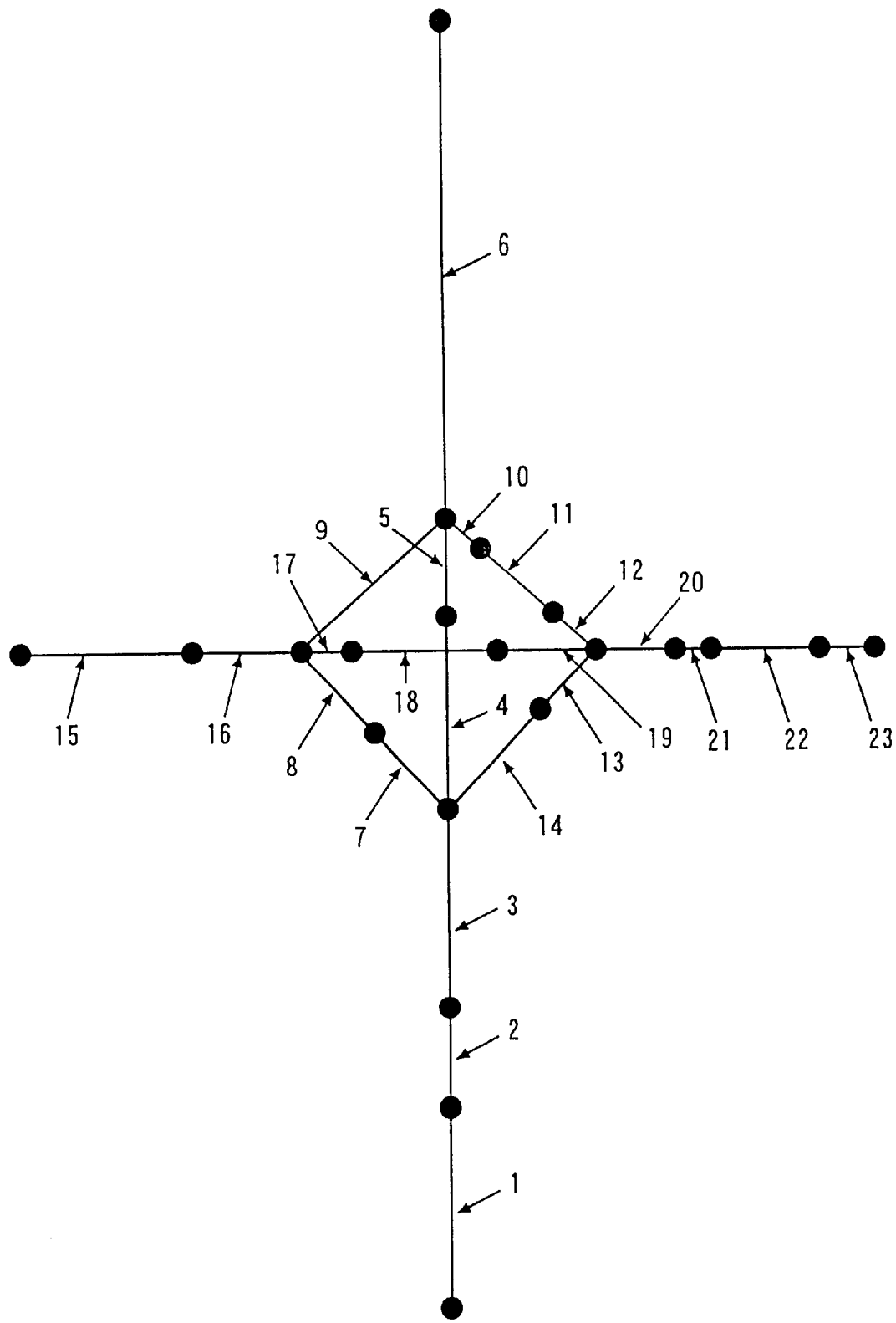
FIG. 6 is a diagram showing the map parameters of FIG. 5 in a form visualized as a two-dimensional map.

FIG. 5 shows an example of the parameter data extracted from the two-dimensional map data in step S4. In FIG. 5, the vertically listed numbers 1 to 23 correspond to 23 roads (hereinafter referred to as links). For example, it shows that the link 1 has a length of 20 m and four lanes, and its link attribute shows that it is a part of an ordinary-type road. Further, since bidirectional passage is permitted, it is known that the four lanes include two lanes for one direction and two lanes for the opposite direction. It also shows that the link 4 has a length of 20 m and two lanes, and its link attribute shows that it is an elevated road. Accordingly it is known that information for a vertical direction must be provided for the link 4. It shows that the link 7 has a length of 5 m and one lane, and its link attribute shows a side pass. Further, the link 17 has a length of 5 m and two lanes, and its link attribute shows an underpass (a road running under an elevated road). The map parameters shown in FIG. 5 can be visualized as a two-dimensional map as shown in FIG. 6.

While this embodiment adopts DRMA for a format of the two-dimensional map data stored in the two-dimensional map data storage portion 3 as stated above, two-dimensional map data described in another map data format may be stored in the two-dimensional map data storage portion 3. When some data is wanting, e.g. information contained in DRMA but not in another map data format (e.g., information about the number of lanes), or information contained in another map data format but not in DRMA, it will be separately entered from the input portion.2.

Figure 7:
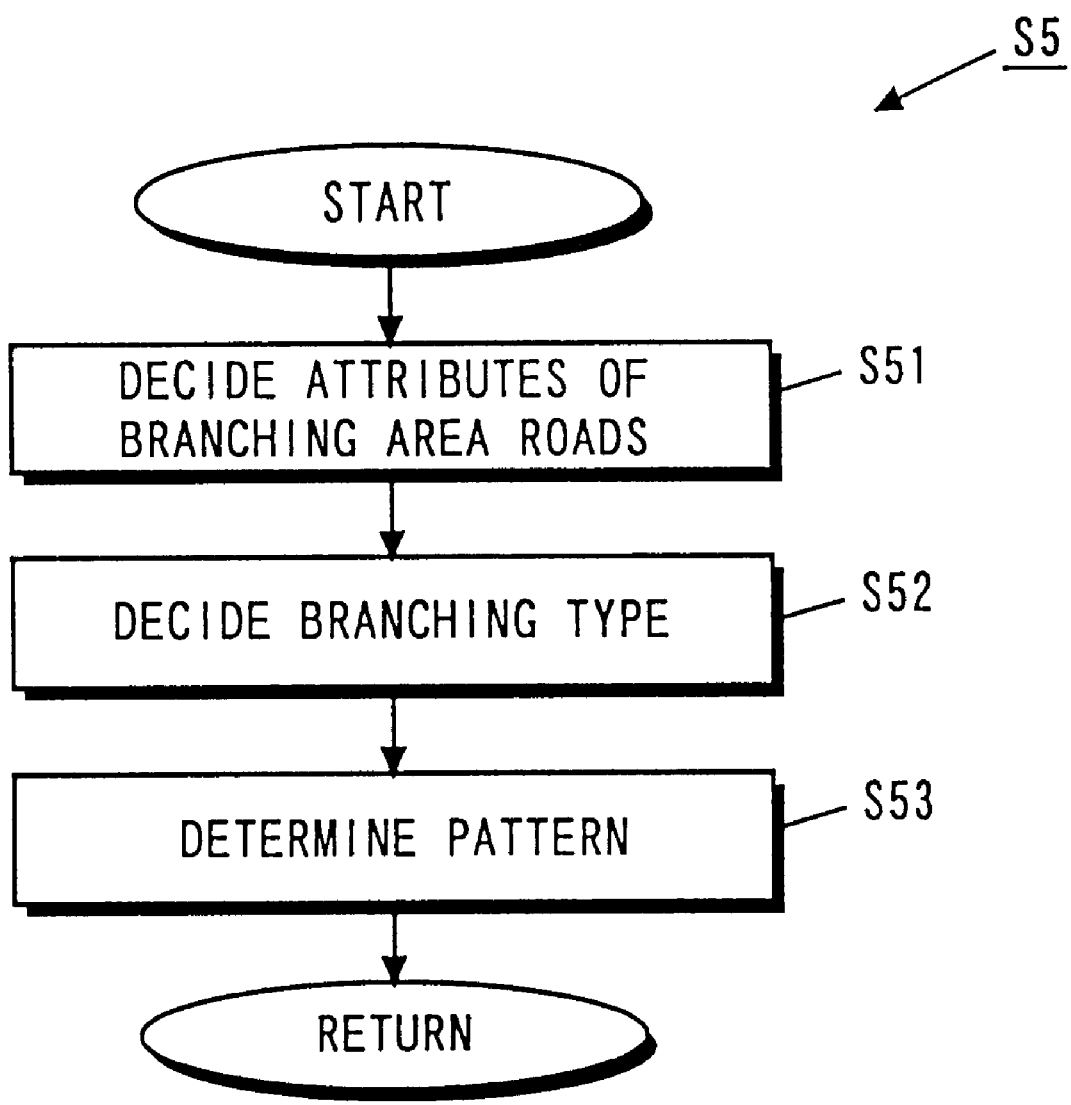
FIG. 7 is a flowchart showing the more detailed operation of the subroutine step S5 shown in FIG. 4.

Next, the pattern determining portion 431 analyzes parameter data extracted by the parameter data extracting portion 42 to determine to which patterns of intersection configuration previously classified the three-dimensional configuration of the target road area belongs (step S5). FIG. 7 shows the details of this subroutine step S5.

Figure 8:
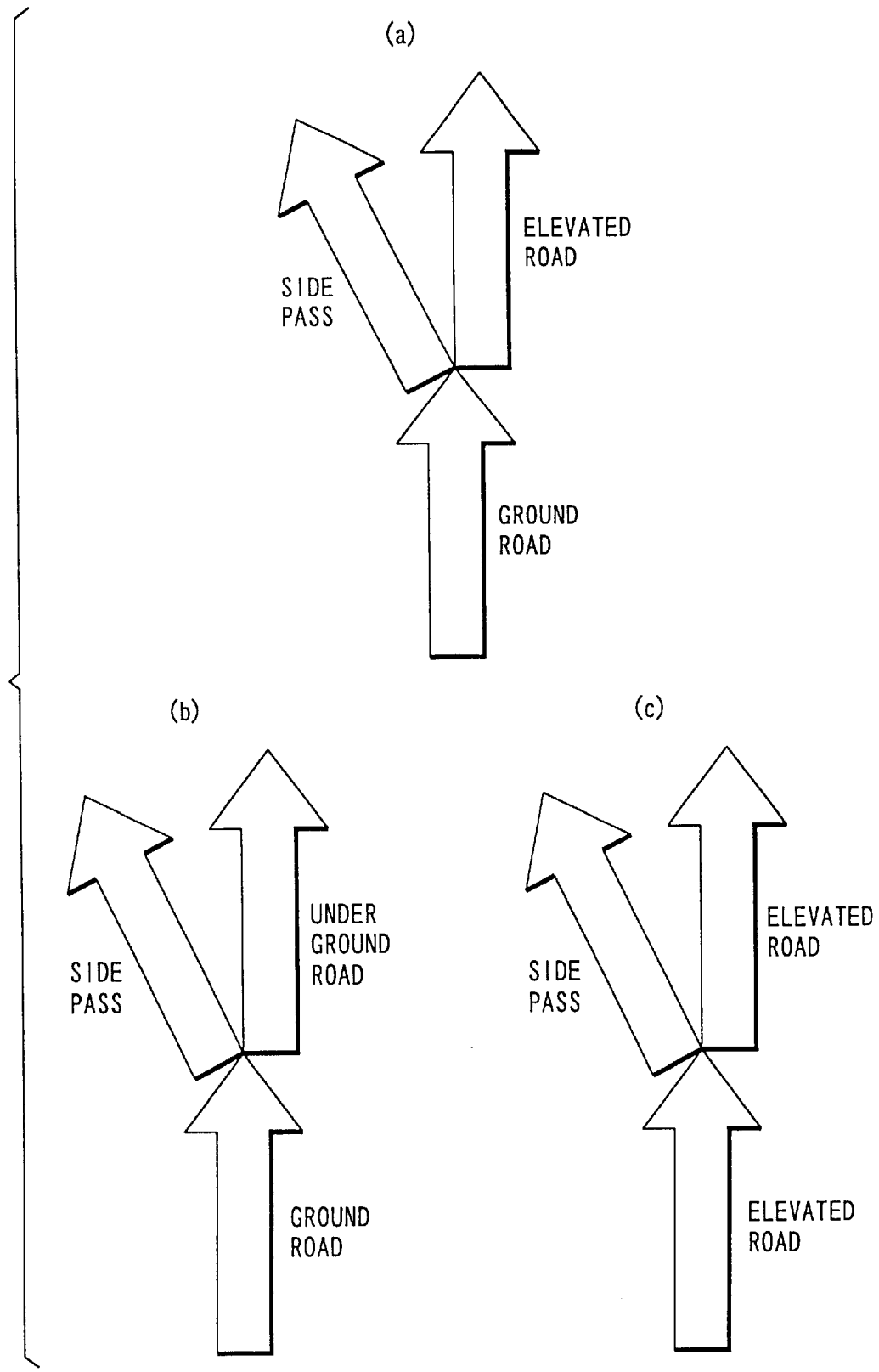
FIG. 8 is a diagram showing examples of types of branching roads.

Referring to FIG. 7, the branching area road attribute deciding portion 4311 checks, first of all, all the roads connecting to the point required to be navigated (e.g., a branching point between a main road and a side pass) on the basis of the parameter data extracted by the parameter data extracting portion 42 to decide each attribute thereof; elevated road, underpass, or road on the ground (step S51). Second, the branch type deciding portion 4312 decides the type of the branching on the basis of the attributes of the connected roads decided by the branching area road attribute deciding portion 4311 (step S52). The branch type may contain, as shown in FIG. 8, case (a) in which a road on the ground branches out into an elevated road and a side pass, case (b) in which a road on the ground branches out into an underpass and a side pass, and case (c) in which an elevated road branches out into an elevated road and a side pass. It then decides a three-dimensional map display model pattern to be used on the basis of the determined type of the branching (step S53). This decision may be made by the operator, in which case a pattern number is entered into the parameter data analyzing portion 43 from the input portion 2. For the three-dimensional map display model patterns, for example, the case (a) of a road on the ground branching out into an elevated road and a side pass may correspond to the three-dimensional map display model pattern shown in FIG. 9, the case (b) of a road on the ground branching out into an underpass and a side pass may correspond to the three-dimensional map display model pattern shown in FIG. 10, and the case (c) of an elevated road branching out into an elevated road and a side pass may correspond to the three-dimensional map display model pattern shown in FIG. 11. Further, the branch type deciding portion 4312 gives a pattern number corresponding to the determined or entered pattern to the pattern model storage portion 5 to read out the pattern data corresponding to the determined or entered pattern from the pattern model storage portion 5. As stated above, the pattern model storage portion 5 contains pattern data for defining types of parameters required to transform each three-dimensional map display model. FIG. 12 shows an example of the pattern data stored in the pattern model storage portion 5. As shown in FIG. 12, the pattern data is prepared as blank table data in which parameters are to be set.

Referring to the main routine of FIG. 4 again, the parameter data classifying portion 432 classifies the two-dimensional parameter data extracted by the parameter data extracting portion 42 according to their respective road functions, on the basis of the pattern determined in the pattern determining portion 431 (step S6). In the data classification, for example, a multi-level intersection may be classified into a road not on the ground for a part of the multi-level intersection, a side pass to make a right/left turn, and an approach. The road functions may be classified on the basis of the configuration of intersections in this way; in another method, a series of roads existing between adjacent branching points, or between adjacent merging points, or between adjacent branching point and merging point, may be classified as a group of roads having the same function.

FIG. 13 shows an example of the two-dimensional parameter data classified according to the road function. The data shown in FIG. 5 are used as the classified data. In FIG. 13, the vertically listed numbers 1 to 10 correspond to ten roads differing in function. For example, the link Nos.1 to 3 are data of the same road function, which are classified as the road No.1; similarly, the link Nos.4 and 5 are classified as the road No.2, link No.6 as road No.3, link Nos.7 and 8 as road No.4, link No.9 as road No.5, link Nos.10 to 12 as road No.6, link Nos.13 and 14 as road No.7, link Nos.15 and 16 as road No.8, link Nos.17 to 19 as road No.9, and link Nos.20 to 23 as road No.10.

Figure 14:
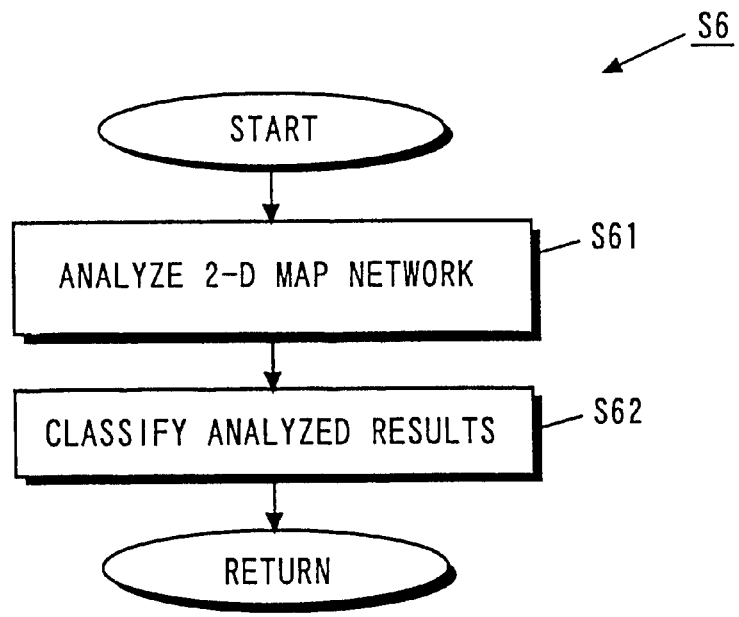
FIG. 14 is a flowchart showing the more detailed operation of the subroutine step S6 shown in FIG. 4.
Figure 15:
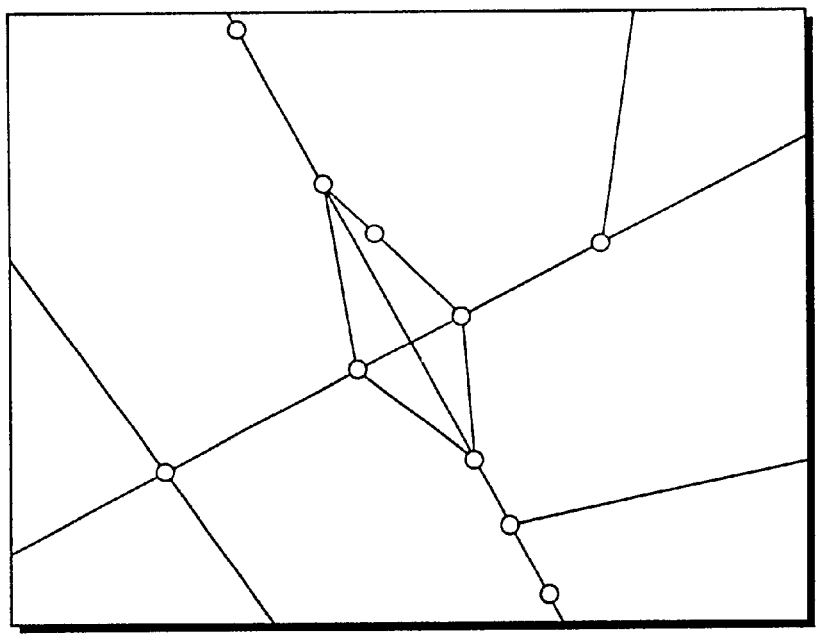
FIG. 15 is a diagram showing an example of a two-dimensional map.

FIG. 14 shows the greater details of the above-described operation in the subroutine step S6. Referring to FIG. 14, first, the link tracing portion 4321 traces links in the three-dimensioned area on the basis of the parameter data extracted by the parameter data extracting portion 42 and temporarily holds the links required to generate a three-dimensional map display model (step S61). FIG. 15 shows an example of the two-dimensional map, FIG. 16 shows an example of results of the trace of links, and FIG. 17 shows an example of results of storage of the data of traced links. The criterion in tracing links may include an attribute, type, angle, area, and the like. Next, the link data classifying portion 4322 classifies the link data held in the link tracing portion 4321 according to the road function (step S62). The road function may include an approach to a branching point, elevated road from the branching point, and side pass from the branching point; the link data are classified into roads having the same function. FIG. 18 shows an example of links classified according to the road function.

Referring to the main routine of FIG. 4 again, the data integrating portion 433 integrates the parameter data classified in the parameter data classifying portion 432 (step S7). The data integration means the operation of integrating the data classified according to road function into one road. This data integrating operation may be achieved by a method of selecting arbitrary data from the plurality of data classified according to road function and adopting the data as representative of the roads in that part, or a method of calculating an average value of the plurality of data classified according to road function and adopting the average value as the road in that part.

FIG. 19 shows an example of parameter data created by integrating data for each road function. The data classified in FIG. 13 are used as the integrated data. For example, while the parameter data corresponding to the road No.1 is regarded as a group of three link data in FIG. 13, the three link data are integrated into one road in FIG. 19. Similarly, the data classified according to road numbers are integrated into one.

Figure 20:
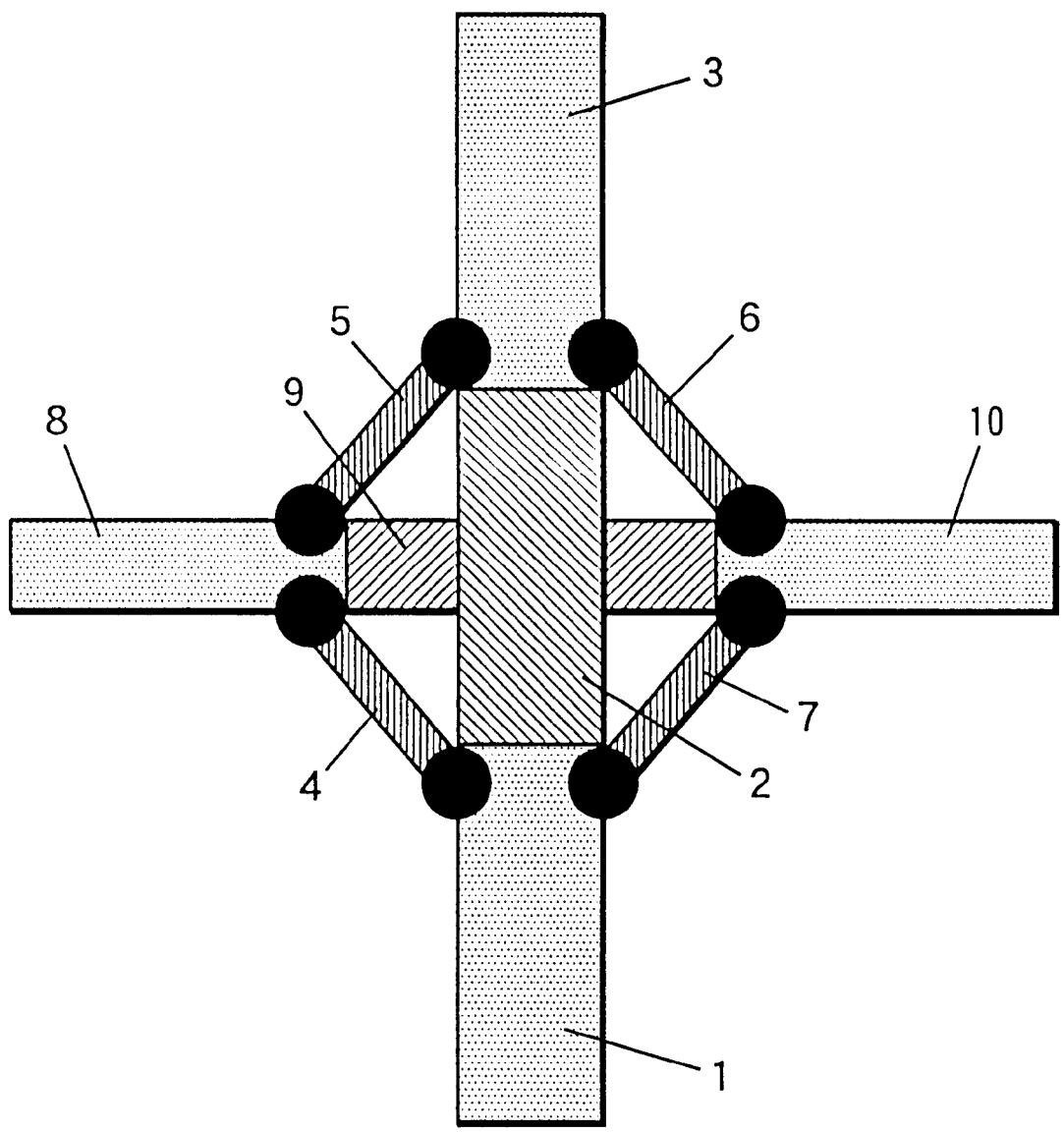
FIG. 20 is a diagram showing the parameter data of FIG. 19 visualized as a two-dimensional map.

The map parameters shown in FIG. 19 can be visualized as a two-dimensional map as shown in FIG. 20. Although FIG. 20 is two-dimensionally represented, it substantially shows an example of intersection pattern prepared as a three-dimensional map display model. In FIG. 20, the types of hatching applied to the road parts 1 to 10 represent the road functions classified in the pattern. More specifically, the road parts 2 and 9 belong to a road not on the ground (elevated road or underpass), the road parts 4 to 7 belong to a side pass, and the road parts 1, 3, 8 and 10 belong to an approach. The parameters of FIG. 19, which have been generated as the result of classification and integration, correspond to the road parts shown in FIG. 20, where the road Nos.1 to 10 in FIG. 19 correspond to the road parts 1 to 10 in FIG. 20, respectively. When the configuration of the prepared intersection pattern differs from that of FIG. 20, a structure integrated according to the pattern configuration is changed in parameter data generated as shown in FIG. 19. The parameter data integrated in the data integrating portion 433 is given to the data converting portion 434 as normalized parameter data.

Next, the data converting portion 434 converts the parameter data given from the data integrating portion 433 into model transforming data on the basis of the pattern data read out from the pattern model storage portion 5 (step S8). The operation of the data converting portion 434 will be described in greater detail below.

Among the parameter data normalized in the normalizing portion 430, the data converting portion 434 first sets parameter data which can be simply transferred, into the pattern data read out from the pattern model storage means 6. FIG. 21 shows an example of the pattern data in which the parameters are set. Referring to FIG. 21, the data converting portion 434 sets the parameter showing length and the parameter showing the number of lanes in the pattern data, as the parameter data which can simply be transferred. The parameter showing the number of lanes is set as the parameter showing the width of road.

Next, the data converting portion 434 analyzes the parameter data normalized in the normalizing portion 430 to infer values of other unset parameters in the pattern data. For example, since the link 2 is an elevated road and the link 9 is an underpass, it infers that the two roads intersect each other with the link 2 located in the higher level. Accordingly a height flag 1 is set to the link 2 in the pattern data, and a height flag 0 is set to the link 9. A height flag with a larger number indicates a higher position. When the angle of the intersection of link 2 and link 9 can be calculated from the normalized parameter data, the calculated intersecting angle is set in the pattern data. Usually, DRMA shows the coordinate positions of links, and the intersecting angles can be calculated from the coordinate positions. The data converting portion 434 also infers the configuration of links and sets the result in the pattern data as the parameter showing the configuration pattern. The configurations of links are classified into some categories. For example, the first category shown in, FIG. 22 (a category showing the shape of ordinary-type roads), the second category shown in FIG. 23 (a category showing the shape of elevated roads), and the third category shown in FIG. 24 (a category showing how the roads are connected at branching/merging points) are included. At this time, in the simplest method for inferring a shape of ordinary-type roads, the shapes of the roads in the whole country are collected so as to decide which shape is the most popular for links of the determined pattern, and then the most popular shape among the roads is set for a shape of the respective link. It is possible to infer how an elevated road is configured, or how roads are connected to one another at a branching/merging point from the relation among interconnected links in the neighborhood.

Parameters not specified by inference may be left unset, or some parameters may be temporarily set. When parameters are not set, the configuration of the links is displayed according to the configuration of a standard three-dimensional map display model buried in the three-dimensional image data generating algorithm executed by the image data generating portion 6. However, there is no problem in this embodiment because the parameters can be corrected later by the operator.

Next, the data converting portion 434 outputs the pattern data in which the parameters are set to the image data generating portion 6 as model transforming data. The image data generating portion 6 generates three-dimensional image data on the basis of the model transforming data, and outputs it to the display 7 (step S9). In response, the display 7 displays a three-dimensional map. The image data generating portion 6 can achieve the calculation by just transforming a previously defined three-dimensional map display model with the model transforming data, instead of performing all the calculations for generating the three-dimensional image data. Accordingly the three-dimensional image data generating algorithm in the image data generating portion 6 can be considerably simplified as compared with the conventional algorithm which processes two-dimensional map data with added width and height information as three-dimensional coordinate data to generate the three-dimensional polygon data. This effect can be obtained similarly also in the three-dimensional map display performed later in the car navigation system carried on a vehicle. The amount of calculation for executing the simplified three-dimensional image data generating algorithm is greatly reduced, which enables smooth map scrolling. The detailed structure and operation of the image data generating portion 6 will be described later.

Figure 25:
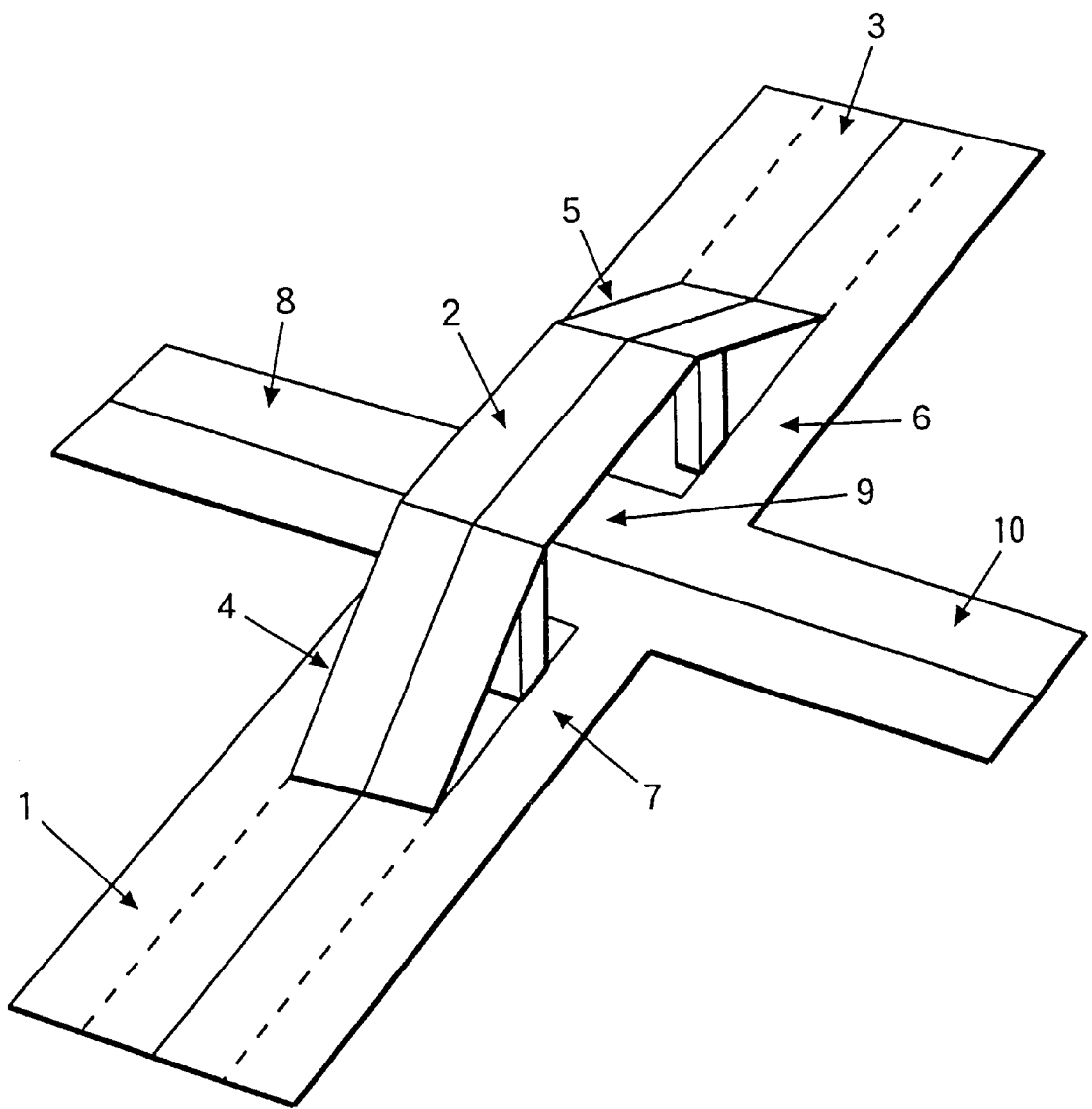
FIG. 25 is a diagram showing an example of display of a three-dimensional map generated by using the model transforming data shown in FIG. 21.

Next, the operator checks the contents displayed in the display 7 to see whether a correct three-dimensional image is displayed (step S10). When the three-dimensional image should be corrected, parameters for change or addition are entered from the input portion 2 (step S11). This changes the contents of the model transforming data generated in the parameter data analyzing portion 43 and the contents displayed in the display 7 also changes accordingly. When the three-dimensional image displayed in the display 7 has been changed to satisfy the operator, the model transforming data generated in the parameter data analyzing portion 43 is outputted to and stored in the model transforming data storage portion 8 (step S12). FIG. 25 shows an example of display of a three-dimensional map corresponding to the model transforming data shown in FIG. 21.

When a large number of areas are specified for three-dimensional display in step S3 of FIG. 4 in the above embodiment, the model transforming data can be generated for all roads on the map, and then the car navigation system can three-dimensionally display all the roads under car-navigation.

Figure 9:
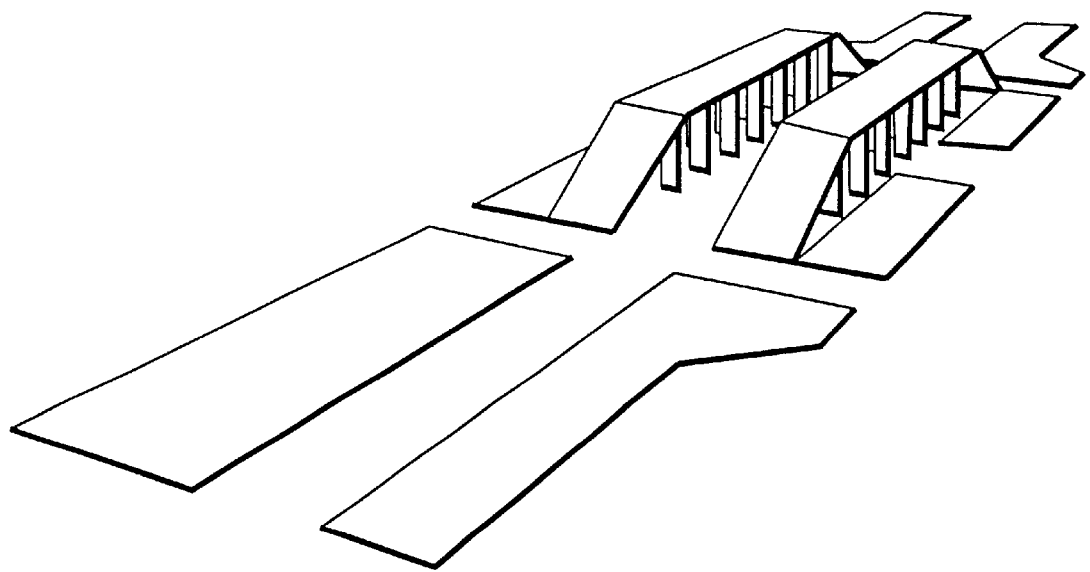
FIG. 9 is a diagram showing an example of three-dimensional map display model pattern used in the case in which a road on the ground branches out into an elevated road and a side pass.
Figure 10:
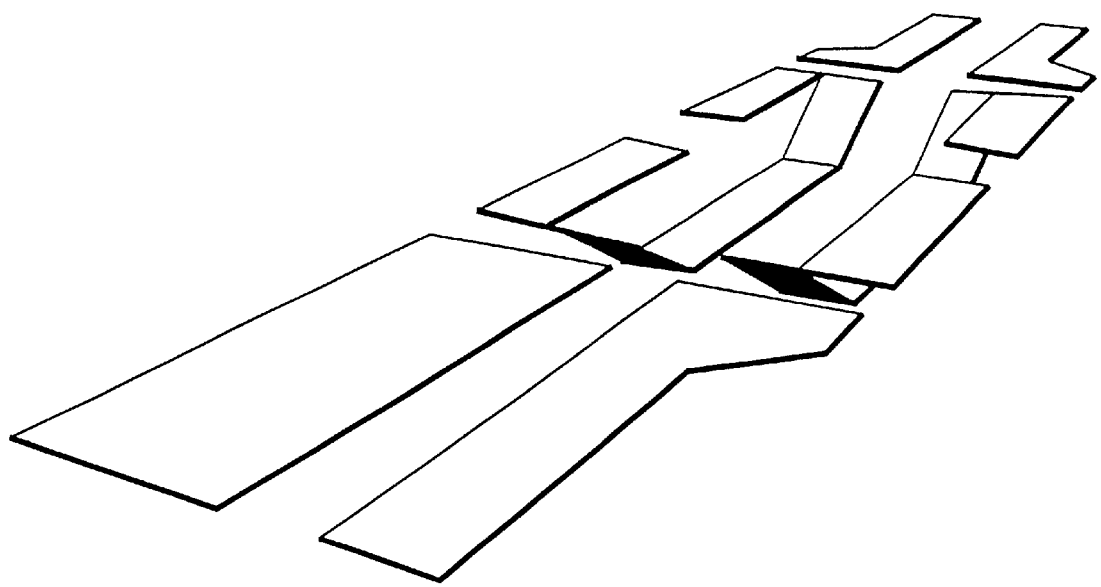
FIG. 10 is a diagram showing an example of three-dimensional map display model pattern used in the case in which a road on the ground branches out into an underpass and a side pass.
Figure 11:
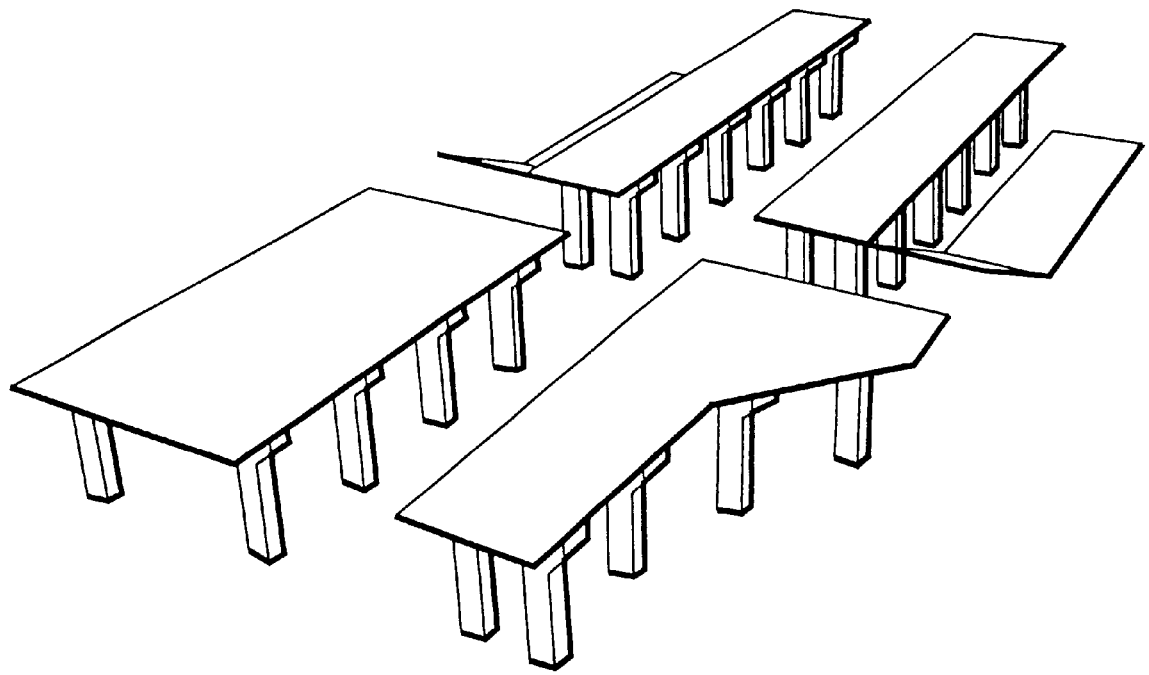
FIG. 11 is a diagram showing an example of three-dimensional map display model pattern used in the case in which an elevated road branches out into an elevated road and a side pass.
Figure 22:
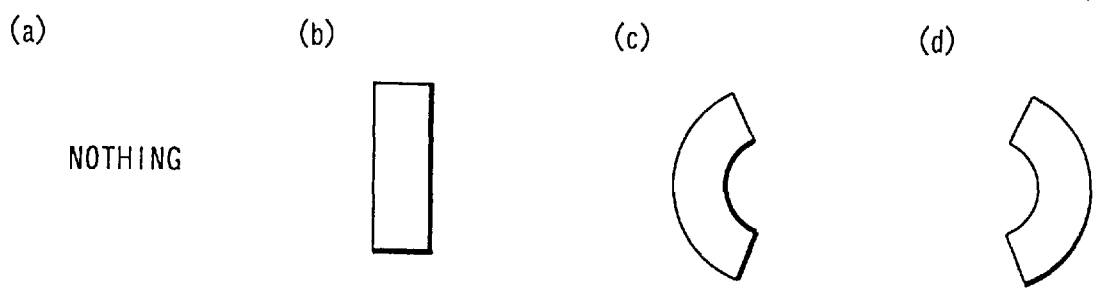
FIG. 22 is a diagram showing examples of shapes of roads which belong to a first category.
Figure 23:
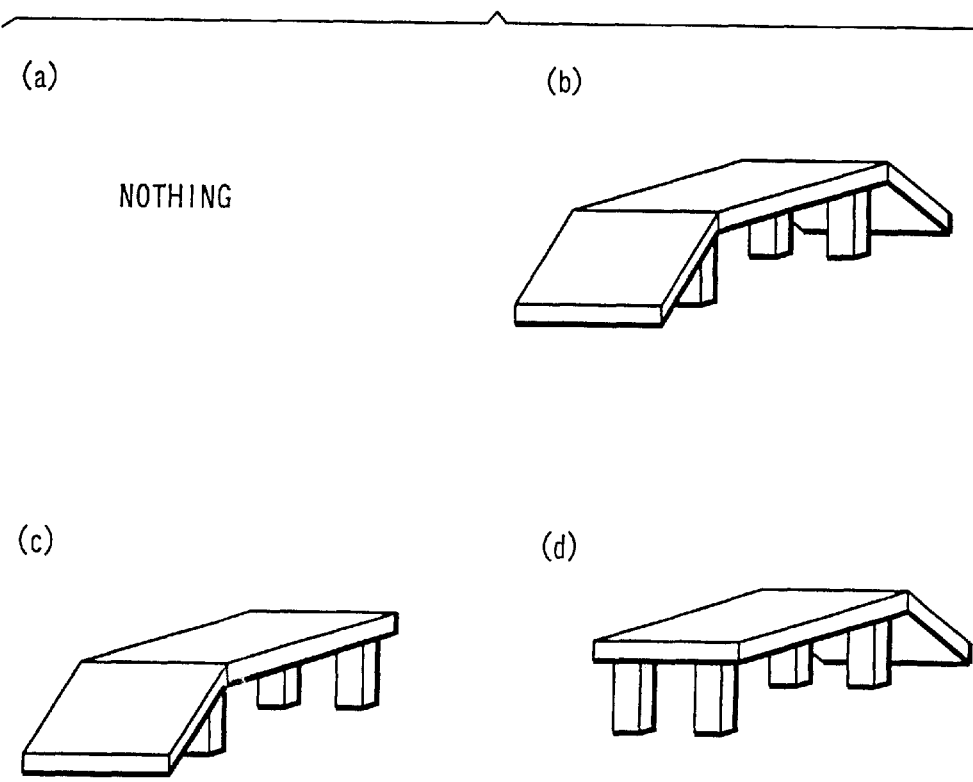
FIG. 23 is a diagram showing examples of shapes of roads which belong to a second category.
Figure 24:
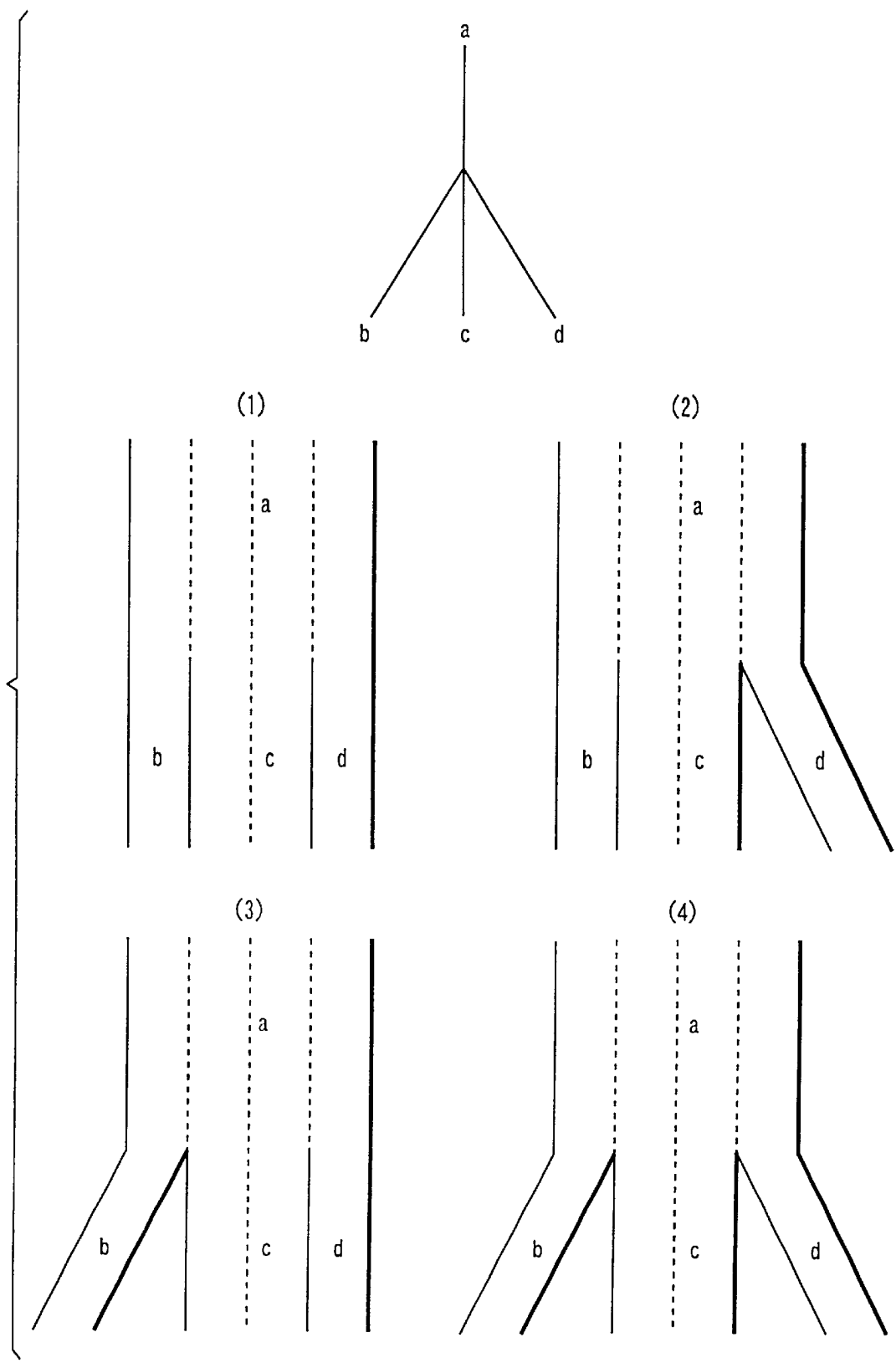
FIG. 24 is a diagram showing examples of shapes of roads which belong to a third category.

Further, in the present invention, in order to improve the efficiency in the process of creating model transforming data and the process of generating the three-dimensional image data, and also in order to improve the quality of the created three-dimensional map data, the three-dimensional map may be created and displayed according to patterns having a hierarchical structure called a macro/micro pattern. The macro pattern handles a mass of models required in navigation as a single pattern; for example, FIGS. 9 to 11 show three-dimensional map display models corresponding to the macro patterns of typical multi-level intersection configurations. For example, FIG. 9 shows a typical multi-level intersection model, which is composed of an approach road reaching a branching point, a side pass, and an elevated road. However, when three-dimensional map display models are created only with the macro pattern models, multi-level intersections not conforming with the patterns cannot be represented, and the number of patterns increases in steps depending on the number of sampling data for the object intersections to be three-dimensionally displayed. Moreover, there is a problem that independently developing different macro patterns reduces expandability and reusability in the future. Accordingly, for the purpose of compensating for the disadvantages of the macro pattern and expanding the three-dimensional display to all roads, the micro pattern system is used together with it to create the three-dimensional map display models. The micro pattern means a unit of pattern, such as the road shape primitive patterns shown in FIG. 22, elevated road shape primitive patterns as shown in FIG. 23, and patterns for connecting primitive patterns as shown in FIG. 24 (branching, merging, intersecting, and the like.); the micropatterns are combined to form a three-dimensional map display model. That is to say, to improve the efficiency in creating the model transforming parameters, and also to normalize the created model for better appearance, typical multi-level intersections are three-dimensioned by using macro patterns showing intersection structures hierarchically structured according to experiential knowledge, and parts not conforming with the structure are three-dimensionally represented by using the micro patterns. However, a desired three-dimensional map display model can be created merely by combining micro patterns, without using the macro pattern.

Figure 26:
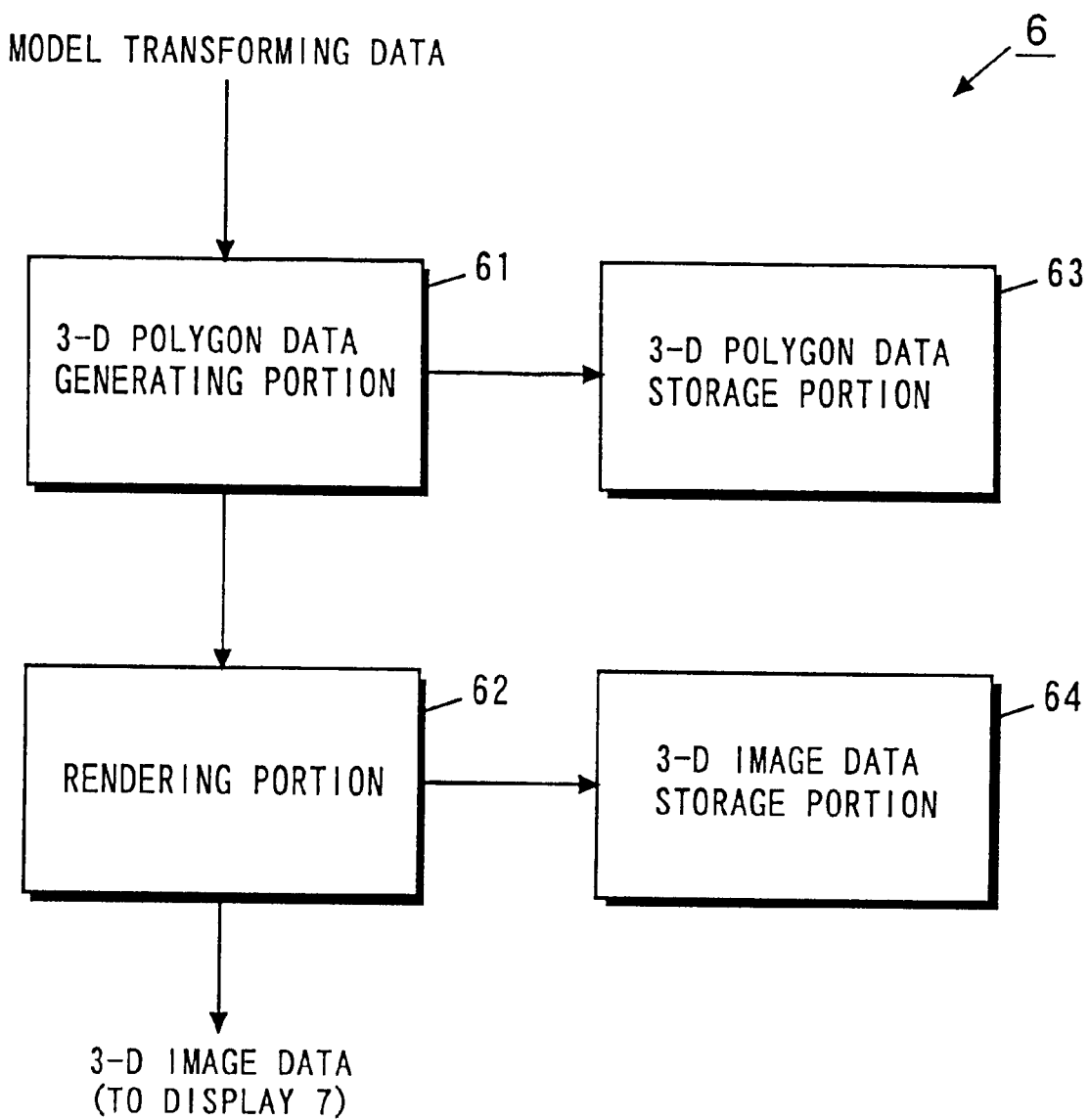
FIG. 26 is a block diagram showing the more detailed structure of the image data generating portion 6 shown in FIG. 1.

FIG. 26 is a block diagram showing the greater details of the image data generating portion 6 shown in FIG. 1. In FIG. 26, the three-dimensional data generating portion 6 includes a three-dimensional polygon data generating portion 61, a rendering portion 62, a three-dimensional polygon data storage portion 63, and a three-dimensional image data storage portion 64.

The three-dimensional polygon data generating portion 61 generates three-dimensional polygon data on the basis of the model transforming data provided from the model transforming data generating portion 4. The generated three-dimensional polygon data is stored in the three-dimensional polygon data storage portion 63 and is also provided to the rendering portion 62. The rendering portion 62 generates three-dimensional image data on the basis of the three-dimensional polygon data generated in the three-dimensional polygon data generating portion 61. The generated three-dimensional image data is stored in the three-dimensional image data storage portion 64 and is also provided to the display 7.

FIG. 27 is a block diagram showing the greater details of the three-dimensional polygon data generating portion 61 shown in FIG. 26. In FIG. 27, the three-dimensional polygon data generating portion 61 includes a model transforming data analyzing portion 611, a three-dimensional polygon data synthesizing portion 612, a configuration attribute storage portion 613, and a three-dimensional polygon library 614.

The model transforming data analyzing portion 611 analyzes the parameter data generated by the model transforming data generating portion 4 for each road area to select a three-dimensional map display model corresponding to the pattern of the road configuration as shown in FIG. 23 and to extract parameter values of the road length, road width, and the like.

The configuration attribute storage portion 613 is used to store parameters for more finely transforming the road configuration pattern model corresponding to the three-dimensional map display model, which contains parameter values for the color and material of roads, spacing and number of bridge girders attached to elevated roads, width of shoulders, height of sound-proof walls, and the like, for example.

FIG. 28 shows an example of contents of parameters and their default values stored in the configuration attribute storage portion 613. In FIG. 28, by way of example, the configuration attribute storage portion 613 contains parameters about the spacing between supports (girders) of elevated road, parameters about safety walls (placement offset, width and height of safety walls), parameters about traffic lights (the file name of the polygon library containing polygon data about traffic lights, height and scale factor, and type of traffic lights), parameters about background (the name of the file containing texture material images used for background), parameters about the size of the three-dimensional model world (width, length and thickness of the ground in the three-dimensional model world, coordinate values of the horizon), parameters about the color of roads, parameters about the color of elevated roads, parameters about the color of safety walls, parameters about the color of supports, parameters about roads (thickness of roads, width of one lane), and parameters about elevated roads (height, h, of one level, grade of first section 11, grade of second section 12, grade of third section 13).

The three-dimensional polygon library 614 contains polygon data for accessories attached to the three-dimensional map, such as traffic lights and various landmarks (banks, shops, schools, etc.).

The three-dimensional polygon data synthesizing portion 612 creates corresponding three-dimensional polygon data by referring to the data analyzed in the model transforming data analyzing portion 611, various parameters stored in the configuration attribute storage portion 613, and polygon data stored in the three-dimensional polygon library 614.

Figure 29:
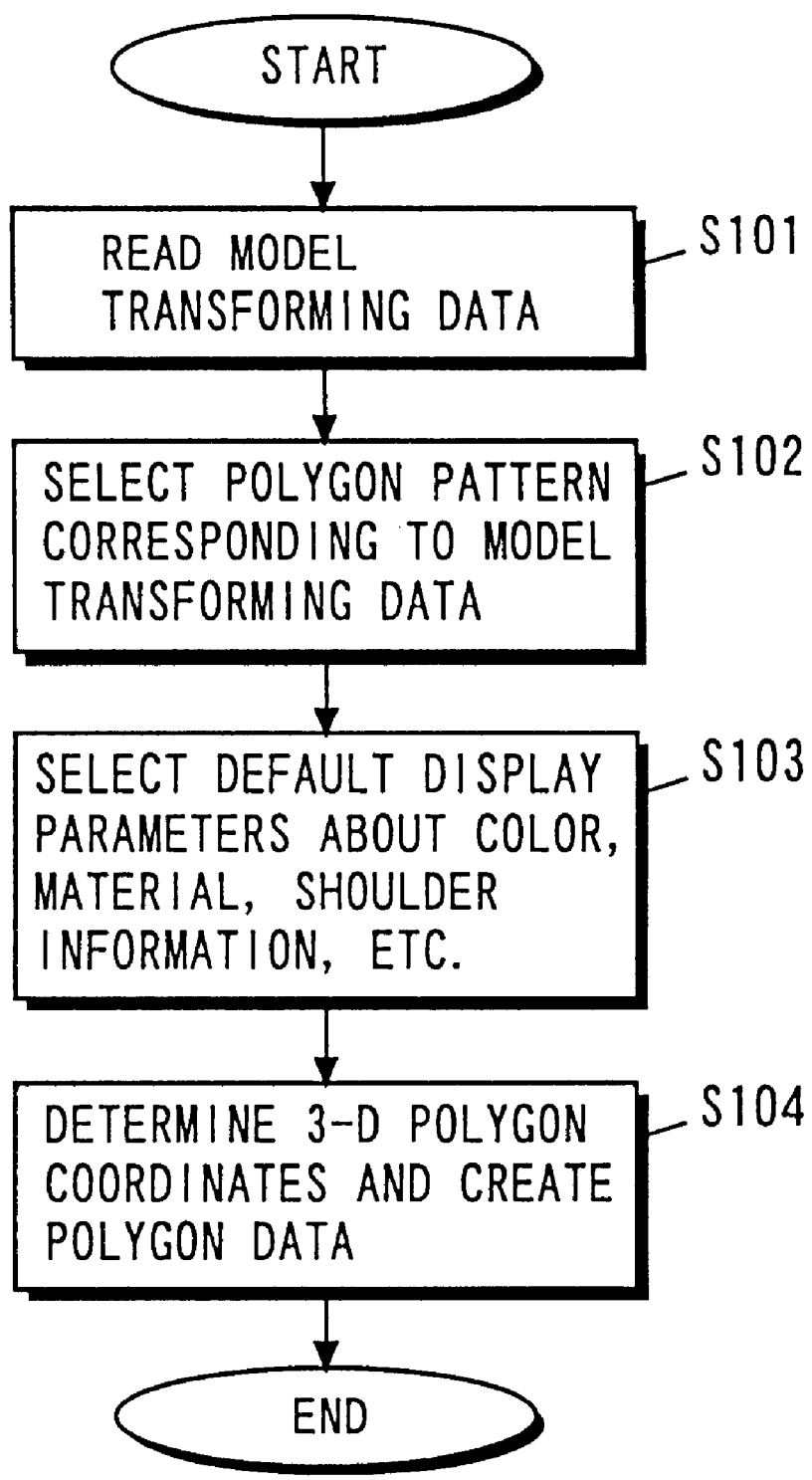
FIG. 29 is a flowchart showing the operation of the three-dimensional polygon data generating portion 61 shown in FIG. 26.

FIG. 29 is a flowchart showing the operation of the three-dimensional polygon data generating portion 61 shown in FIG. 26. Referring to FIG. 29, the operation of the three-dimensional polygon data generating portion 61 will now be described.

First, the model transforming data corresponding to the road area to be three-dimensionally displayed is inputted from the model transforming data generating portion 4 into the three-dimensional polygon data generating portion 61 (step S101). In response, the model transforming data analyzing portion 611 analyzes the input model transforming data and selects a three-dimensional map display model corresponding to such road configuration pattern as shown in FIG. 23 and extracts parameter values about the road length, road width, etc. (step S102). Next, the three-dimensional polygon data synthesizing portion 612 reads default values for various parameters stored in the configuration attribute- storage portion 613 (refer to FIG. 28) and also reads the polygon data for traffic lights and landmarks stored in the three-dimensional polygon library 614 (step S103). Then the three-dimensional polygon data synthesizing portion 612 calculates the three-dimensional coordinates by referring to the data analyzed in the model transforming data analyzing portion 611, various parameters stored in the configuration attribute storage portion 613, and polygon data stored in the three-dimensional polygon library 614, to create three-dimensional polygon data (step S104). The created three-dimensional polygon data is provided to the rendering portion 62.

The operation of the three-dimensional polygon data generating portion 61 will now be described with more specific examples.

Figure 30:
FIG. 30 is a schematic diagram used to explain the operation of the model transforming data analyzing portion 611 shown in FIG. 27.
Figure 31:
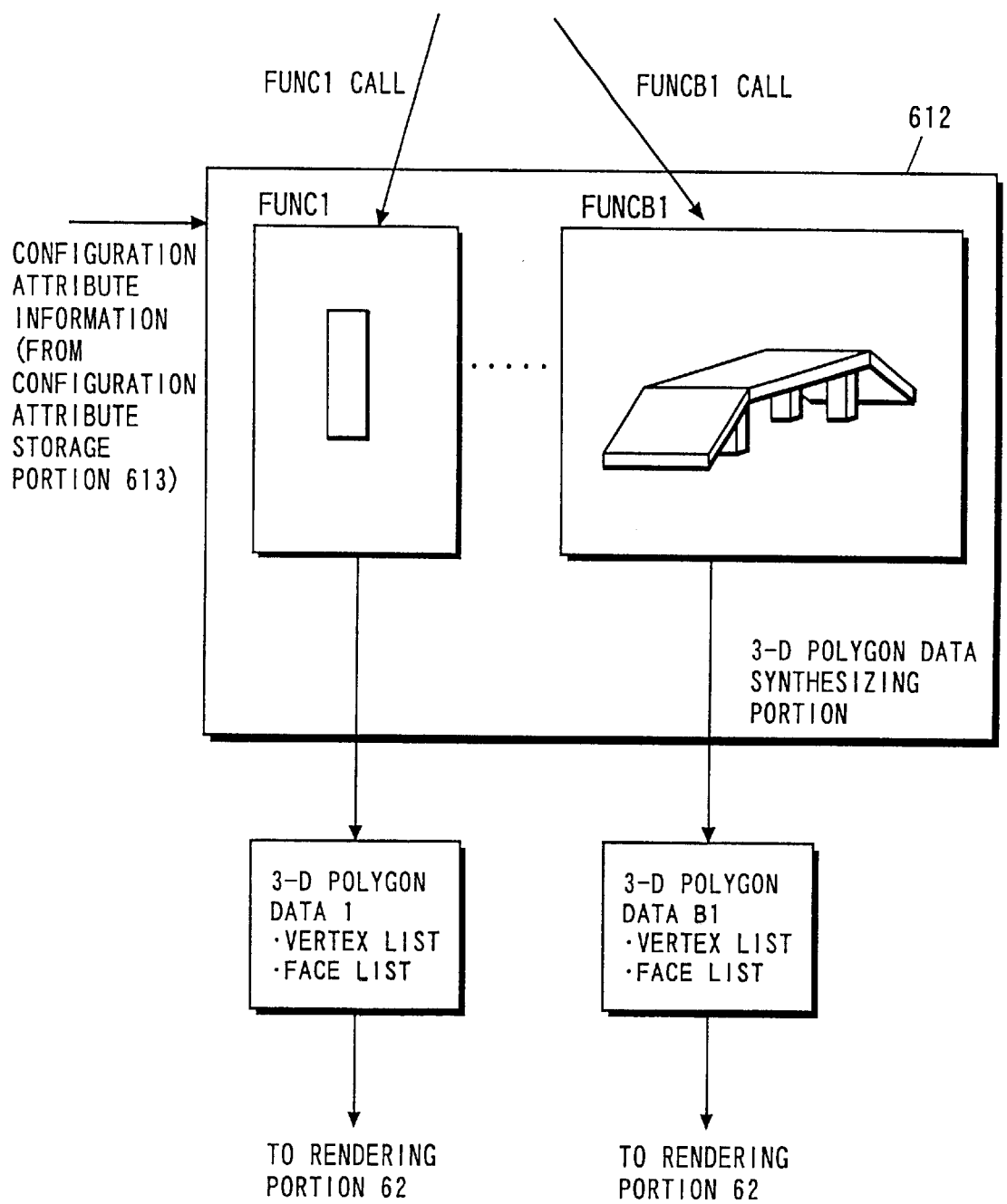
FIG. 31 is a schematic diagram used to explain the operation of the three-dimensional polygon data synthesizing portion 612 shown in FIG. 27.

First, the operation performed when the model transforming data of the link No.1 in FIG. 21 is provided to the three-dimensional polygon data generating portion 61 will be described. As shown in FIG. 30, when the model transforming data about the link No.1 is provided to the model transforming data analyzing portion 611, the model transforming data analyzing portion 611 extracts the following parameters from the model transforming data:

Link No.=1
Length=5
Width=4
Road shape=1
Elevated road shape=no definition
Connection shape=1a
Height=no definition Since the extracted parameters do not define the elevated road shape nor height, it is known that the road corresponding to this link is a road on the ground having no supports for elevated road. At this time, as shown in FIG. 22, since the road shape=1 corresponds to a linear road shape, the model transforming data analyzing portion 611 selects function FUNC1 for generating a rectangular prism polygon from the width, length, and thickness, and sets the parameter values extracted from the model transforming data in the selected function FUNC1 (in this case, length=50, width=4). The function FUNC1 with the set parameter values is provided to the three-dimensional polygon data synthesizing portion 612. is a road on the ground having no supports for elevated road. At this time, as shown in FIG. 22 since the road shape=1 corresponds to a linear road shape, the model transforming data analyzing portion 611 selects function FUNC1 for generating a rectangular prism polygon from the width, length and thickness, and sets the parameter values extracted from the model transforming data in the selected function FUNC1 (in this case, length=50, width=4). The function FUNC1 with the set parameter values is provided to the three-dimensional polygon data synthesizing portion 612.

Receiving the function FUNC1 from the model transforming data analyzing portion 611, the three-dimensional polygon data synthesizing portion 612 reads configuration attribute information required for the function FUNC1 (in this case, color of road=gray, thickness of road=0.5, width of road=3.5) from the configuration attribute information stored in the configuration attribute storage portion 613 (see FIG. 28).

Figure 32:
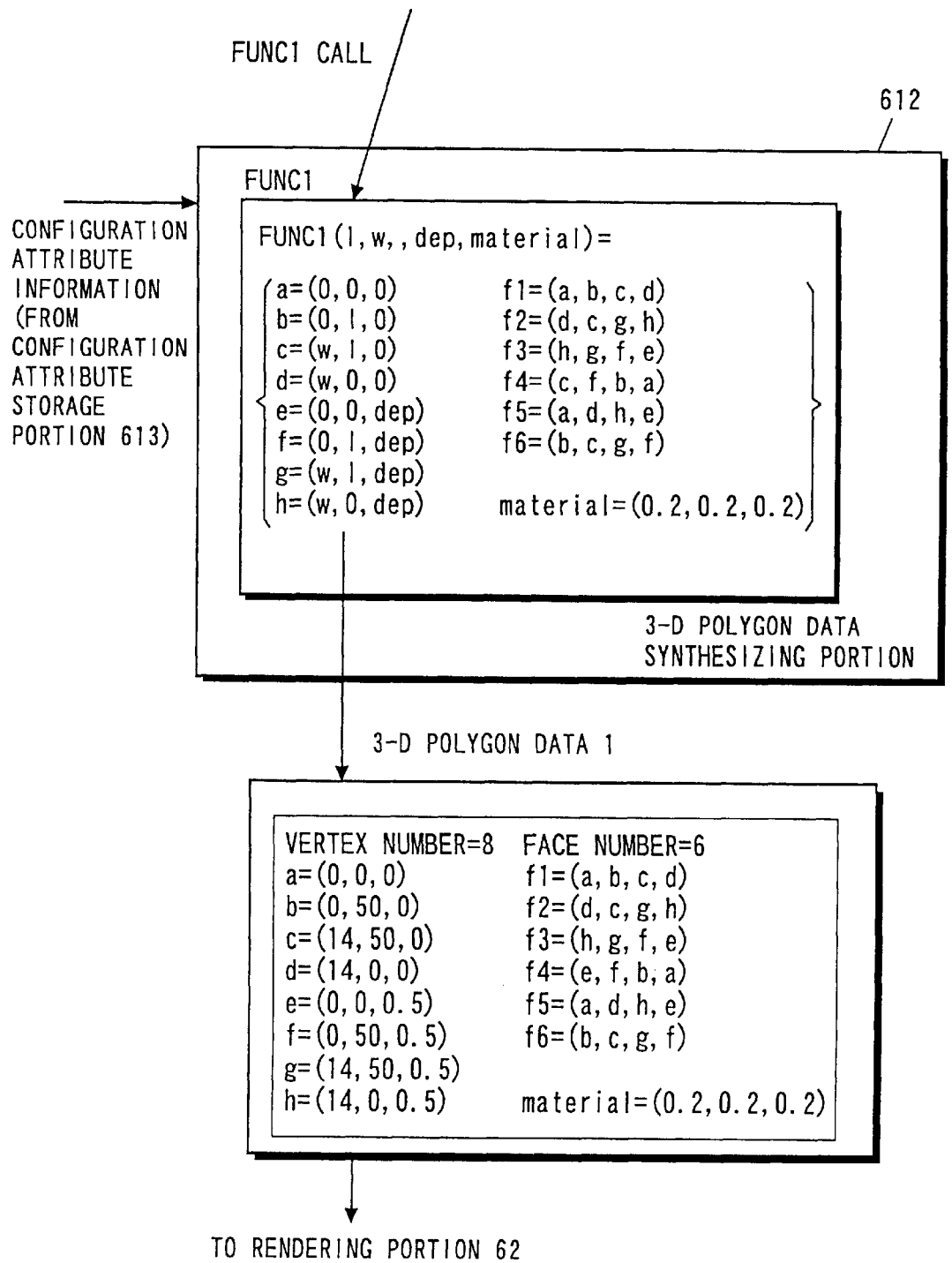
FIG. 32 is a diagram showing the outline of the processing of function FUNC1.
Figure 33:
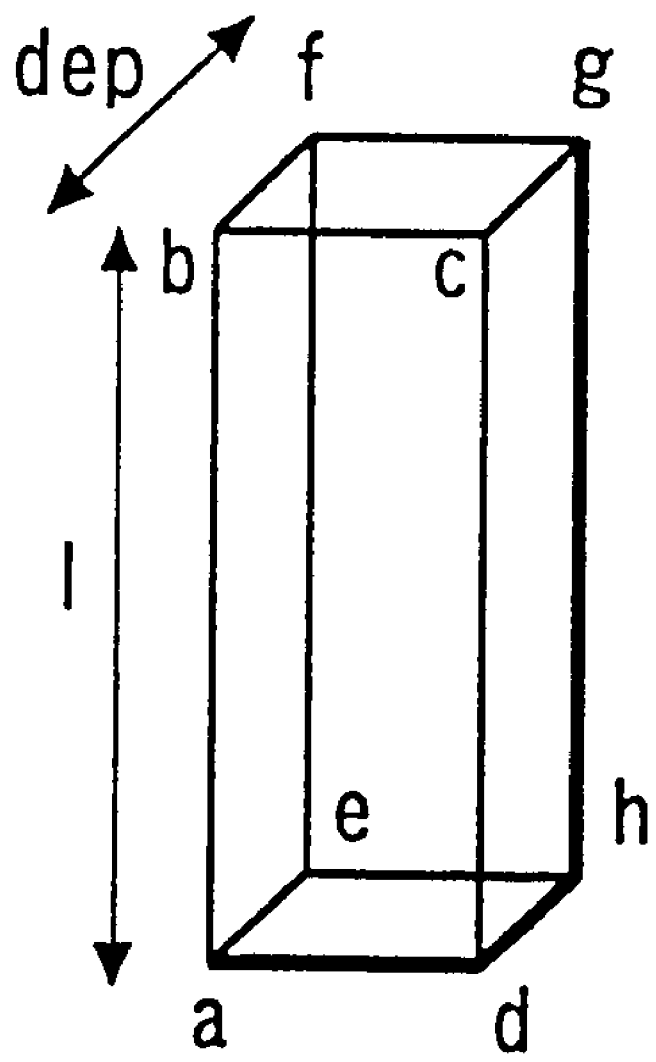
FIG. 33 is an image diagram showing three-dimensional polygon data generated by the function FUNC1.

The outline of the processing of the function FUNC1 will now be described referring to FIG. 32. FIG. 33 shows an image diagram of the three-dimensional polygon data generated in the function FUNC1. The polygon shown in FIG. 33 has the eight vertexes (a, b, c, d, e, f, g, h). Then the coordinates of the vertexes and the list of vertexes defining the faces can be represented by the following combinations of parameters, by calculating with length=1, width=w, and thickness=dep and using the vertex "a" as the origin:

a=(0, 0, 0)
b=(0, l, 0)
c=(w, l, 0)
d=(w, 0, 0)
e=(0, 0, dep)
f=(0, l, dep)
g=(w, l, dep)
h=(w, 0, dep)

The structure of the face list can be represented by the following vertex list:

f1=(a, b, c, d)
f2=(d, c, g, h)
f3=(h, g, f, e)
f4=(e, f, b, a)
f5=(a, d, h, e)
f6=(b, c, g, f)

Then the three-dimensional polygon data synthesizing portion 612 applies w=14, l=50, and dep=0.5 to the functions to calculate values of the vertexes. The calculation provides the following results:

a=(0, 0, 0)
b=(0, 50, 0)
c=(14, 50, 0)
d=(14, 0, 0)
e=(0, 0, 0.5)
f=(0, 50, 0.5)
g=(14, 50, 0.5)
h=(14, 0, 0.5)

Further, since the road texture=gray, the material is set as (R, G, B)=(0.2, 0.2, 0.2). For the RGB value, the RGB default value defining gray is referred to. The road texture may be defined for each face, or one texture may be defined for one road. The three-dimensional polygon data 1 thus calculated is provided to the rendering portion 62 as the three-dimensional polygon data 1 as shown in FIG. 32.

Next, the operation performed when the model transforming data of the link No.4 in FIG. 21 is provided to the three-dimensional polygon data generating portion 61 will now be described. As shown in FIG. 30, when the model transforming data of link No.4 is provided to the model transforming data analyzing portion 611, the model transforming data analyzing portion 611 extracts the following parameters from the model transforming data:

Link No.=4
Length=10
Width=1
Road shape=1
Elevated road shape=1
Connection shape=1d
Height=no definition Since the extracted parameters define the shape of elevated road, it is known that the road corresponding to this link is a road not on the ground. At this time, as shown in FIG. 22, since the road shape=1 corresponds to the linear road shape, the model transforming data analyzing portion 611 selects function FUNCB1 for generating an elevated-road type polygon only from the width, length, and thickness, and sets the parameter values extracted from the model transforming data in the selected function FUNCB1 (in this case, length=10, width=1). The function FUNCB1 with the set parameter values is provided to the three-dimensional polygon data synthesizing portion 612.

Receiving the function FUNCB1 from the model transforming data analyzing portion 611, the three-dimensional polygon data synthesizing portion 612 reads configuration attribute information required for the function FUNCB1 (in this case, color of road=gray, thickness of road=0.5, width of road=3.5, h=3, l1=2, l2=6, l3=2) from the configuration attribute information stored in the configuration attribute storage portion 613 (see FIG. 28).

Figure 34:
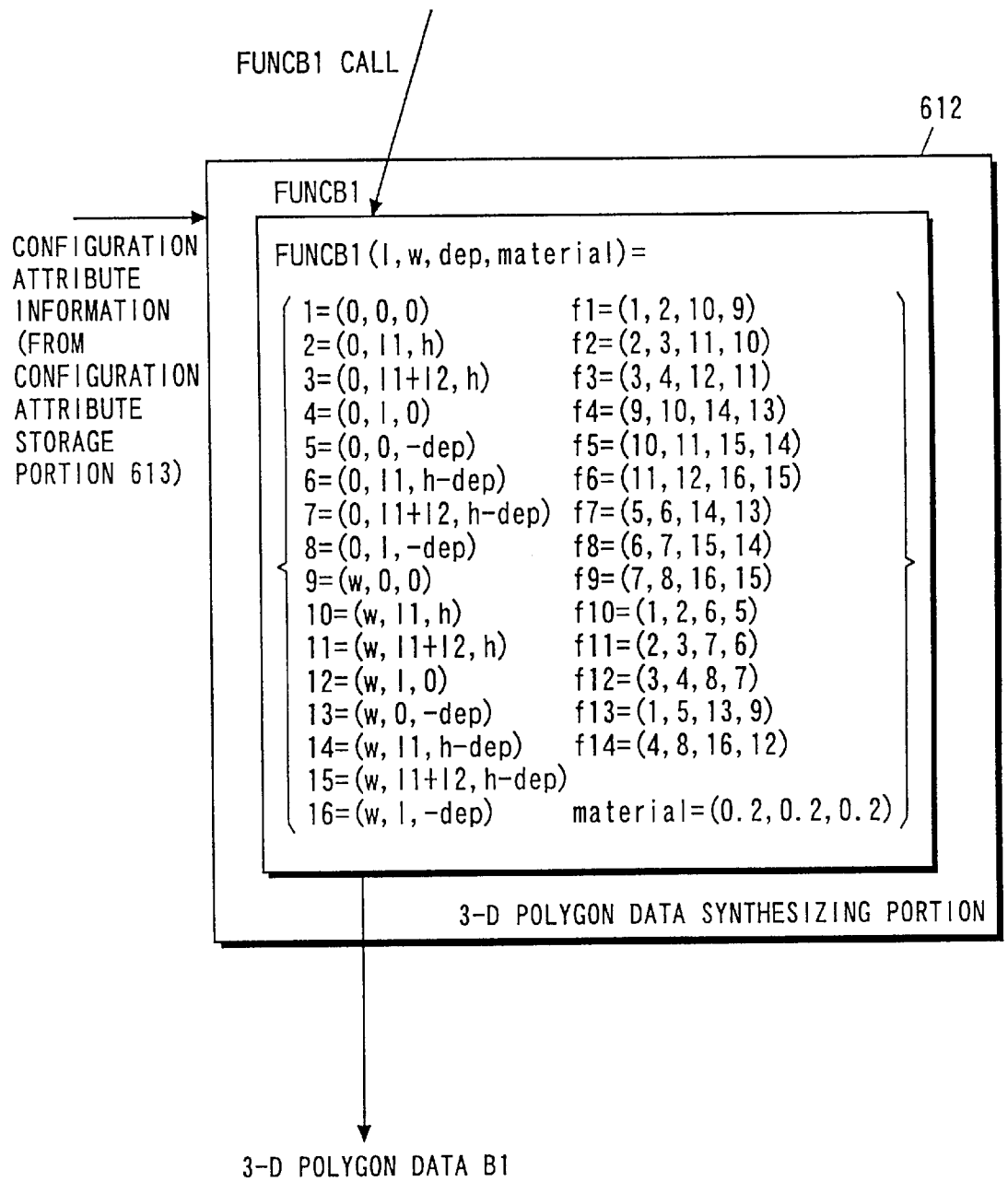
FIG. 34 is a diagram showing the outline of the processing of function FUNCB1.
Figure 36:
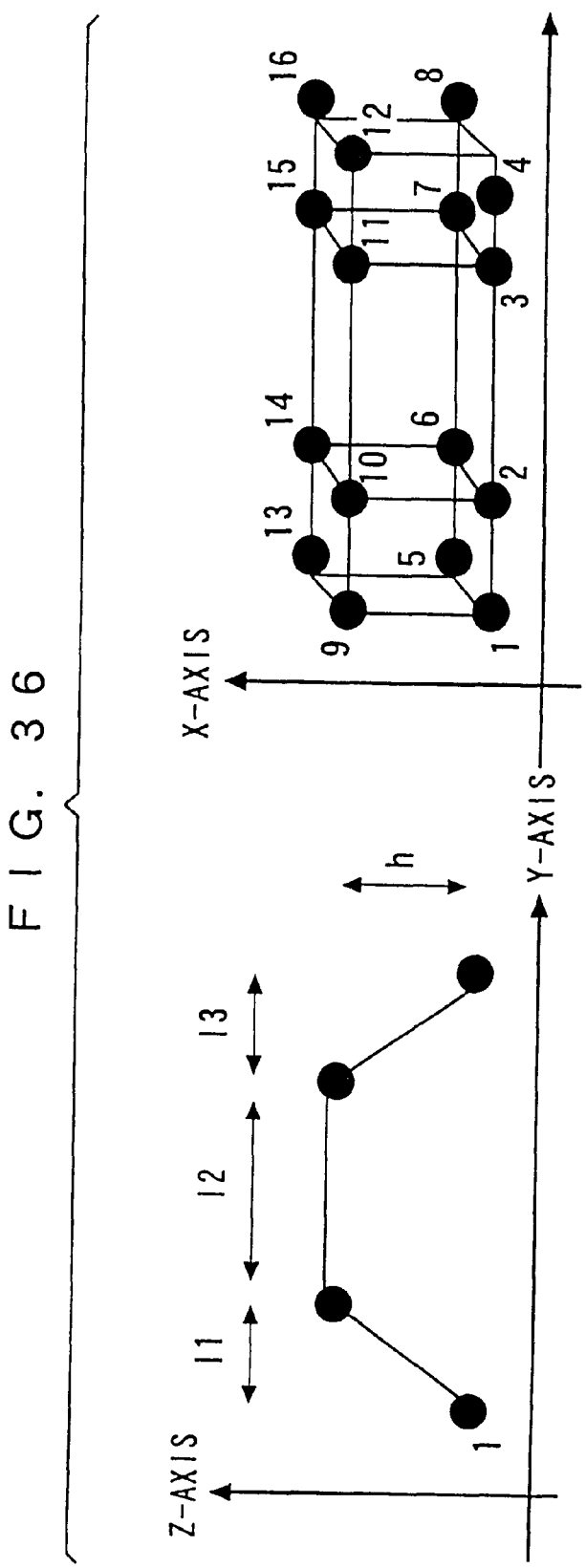
FIG. 36 is an image diagram showing three-dimensional polygon data generated by the function FUNCB1.

The outline of the processing of the function FUNCB1 will now be described referring to FIGS. 34 and 35. FIG. 36 shows an image diagram of the three-dimensional polygon data generated in the function FUNCB1. The polygon shown in FIG. 36 has the 16 vertexes (1, 2, 3, 4, 5, 6, 7, 8, 9, 10, 11, 12, 13, 14, 15, 16). Then the coordinates of the vertexes and the list of vertexes defining the faces can be represented by the following combinations of parameters, by calculating with length=l, width=w, and thickness=dep, and elevated-road parameter height=h, first section grade=l1, second section grade=l2, third section grade=l3, and using the vertex 1 as the origin:

1=(0, 0, 0)
2=(0, l1, h)
3=(0, l1+l2, h)
4=(0, l, 0)
5=(0, 0, −dep)
6=(0, l1, h−dep)
7=(0, l1+l2, h−dep)
8=(0, l, −dep)
9=(w, 0, 0)
10=(w, l1, h)
11=(w, l1+l2, h)
12=(w, l, 0)
13=(w, 0, −dep)
14=(w, l1, h−dep)
15=(w, l1+l2, h−dep)
16=(w, l, −dep)

The structure of the face list can be represented by the following vertex list:

f1=(1, 2, 10, 9)
f2=(2, 3, 11, 10)
f3=(3, 4, 12, 11)
f4=(9, 10, 14, 13)
f5=(10, 11, 15, 14)
f6=(11, 12, 16, 15)
f7=(5, 6, 14, 13)
f8=(6, 7, 15, 14)
f9=(7, 8, 16, 15)
f10=(1, 2, 6, 5)
f11=(2, 3, 7, 6)
f12=(3, 4, 8, 7)
f13 (1, 5, 13, 9)
f14=(4, 8, 16, 12)

Then the three-dimensional polygon data synthesizing portion 612 applies w=3.5, l=10, dep=0.5, l1=2, l2=6, l3=2, h=3 to the functions to calculate the values of the vertexes. The calculation results as follows:

1=(0, 0, 0)
2=(0, 2, 3)
3=(0, 4, 3)
4=(0, 10, 0)
5=(0, 0, −0.5)
6=(0, 2, 2.5)
7=(0, 4, 2.5)
8=(0, 10, −0.5)
9=(3.5, 0, 0)
10=(3.5, 2, 3)
11=(3.5, 4, 3)
12=(3.5, 10, 0)
13=(3.5, 0, −0.5)
14=(3.5, 2, 2.5)
15=(3.5, 4, 2.5)
16=(3.5, 10, −0.5)

Further, since the elevated-road texture=gray, the material is set as (R, G, B)=(0.2, 0.2, 0.2). For the RGB value, the RGB default value defining gray is referred to. The elevated-road texture may be defined for each face, or one texture may be defined for one elevated road. The three-dimensional polygon data B1 thus calculated is provided to the rendering portion 62 as the three-dimensional polygon data B1 as shown in FIG. 35.

The three-dimensional polygon data generating portion 61 repeats the above-described series of processes for the number of the model transforming data. While the three-dimensionally polygon synthesized coordinate values are described about the origin to simply describe the flow of processing, the adjustment of the coordinate values is re-calculated on the basis of the connecting configuration pattern and intersecting angle values in the model transforming data.

The model transforming data are created for a plurality of road areas as described above and stored in the model transforming data storage portion 8. After that, preferably, the model transforming data stored in the model transforming data storage portion 8 are stored in the same storage medium together with the two-dimensional map data stored in the two-dimensional map data storage portion 3. At this time, the correspondence between the model transforming data and the two-dimensional map data is also described in the storage medium. The storage medium is then set in a car navigation system carried on a vehicle and used for navigation. That is to say, the car navigation system has a three-dimensional image data generating algorithm equivalent to step S9 in FIG. 4, and when the vehicle comes closer to a road area to be three-dimensionally displayed, the three-dimensional image data generating algorithm reads out a model transforming data corresponding to the road area, gives it to the corresponding three-dimensional map display model and transforms it, and thus generates and displays the desired. three-dimensional image data.

The model transforming data obtained in the above-described way can be applied not only to a navigation system for a vehicle but also to a drive simulator operating on a personal computer and to a portable navigation system carried by a man.

Although the model transforming data created by the model transforming data creating device is stored in a storage medium and used in a car navigation system in the above-described embodiment, three-dimensional polygon data stored in the three-dimensional polygon data storage portion 63 or three-dimensional image data stored in the three-dimensional image data storage portion 64 may be stored in the map storage medium in place of the model transforming data and used in the car navigation system. In this case, the processing load on the car navigation system is reduced for it does not perform the calculation for transforming the three-dimensional map display models, but the amount of data stored in the map storage medium is increased.

Figure 37:
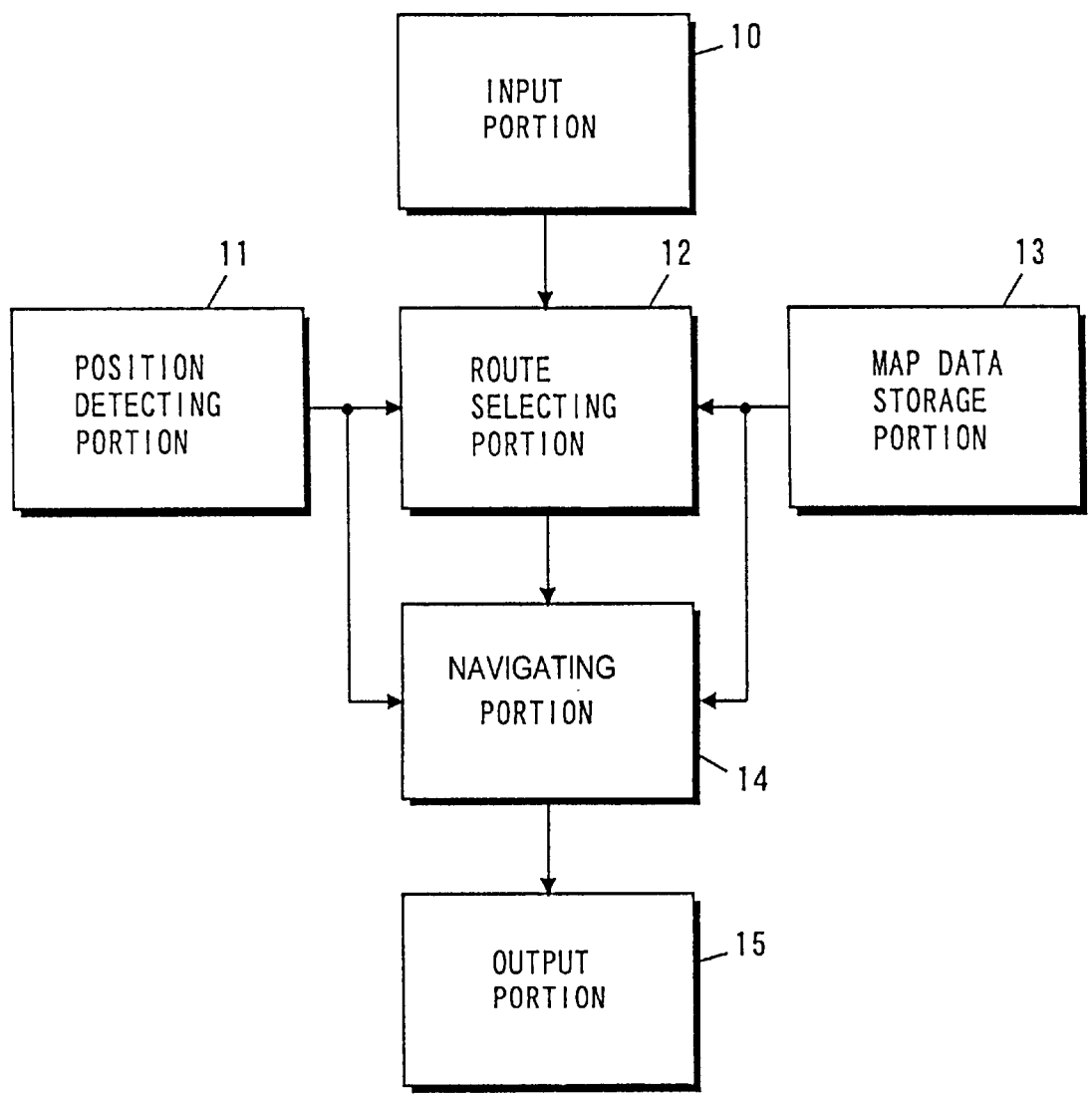
FIG. 37 is a block diagram showing the structure of a navigation device according to an embodiment of the present invention.

FIG. 37 is a block diagram showing the structure of a navigation system according to an embodiment of the present invention. In FIG. 37, the navigation system of this embodiment includes an input portion 10, a position detecting portion 11, a map data storage portion 13, a route selecting portion 12, a navigating portion 14, and an output portion 15.

The input portion 10 includes a remote controller, a touch sensor, a keyboard, a mouse, and the like, which is used to select functions of the navigation system (to change the processed item, change the map, change the hierarchical level, etc.) and also to set a point, select the search mode, and the like. The position detecting portion 11 includes a GPS, a car-velocity sensor, an angular velocity sensor, an absolute direction sensor, and the like, which is used to detect the current position of the vehicle. The map data storage portion 13 is composed of an optical disk (CD, DVD, etc.), a hard disk, a large-capacity memory, and the like, in which the two-dimensional map data is stored. The route selecting portion 12 reads the map data of an object area from the map data storage portion 13, determines the starting point and destination on the basis of the current position of the vehicle detected by the position detecting portion 11 and point information entered from the input portion 10, and selects the smallest cost route from the starting point to the destination (the shortest-time route or the shortest-distance route) while considering traffic regulations at intersections and one-way traffic regulations. The navigating portion 14 generates information on navigation for directing the vehicle to reach the destination according to the navigated route selected by the route selecting portion 12 on the basis of the map data obtained from the map data storage portion 13 and the current position of the vehicle detected by the position detecting portion 11. The navigation performed here may be realized with map display, with voice, and the like. The output portion 15 includes a display device (liquid-crystal display, CRT display, etc.), a speaker, etc., which displays information on navigation generated in the navigating portion 14 and/or outputs it in audio.

Figure 38:
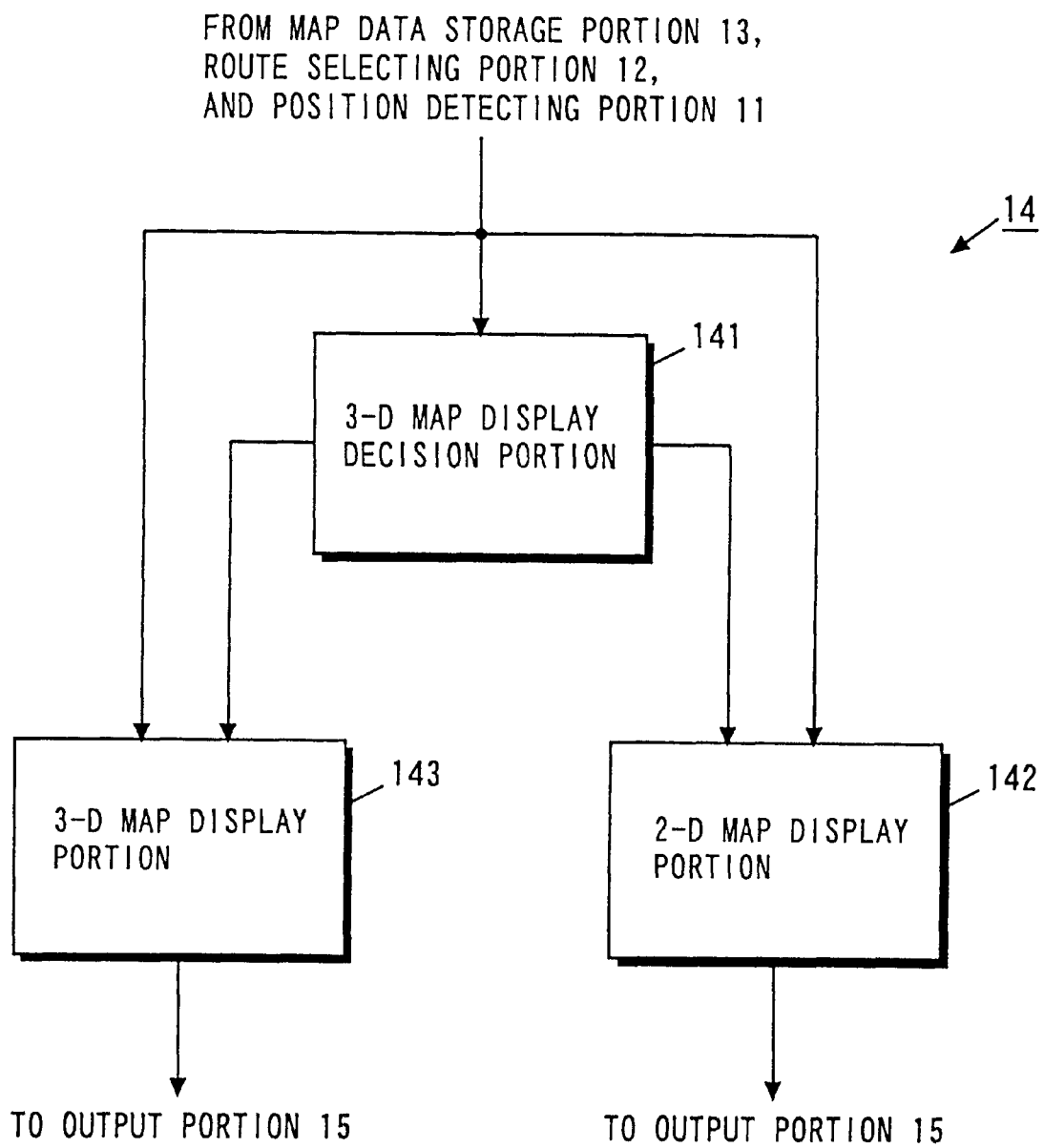
FIG. 38 is a block diagram showing the greater details of the structure of the navigating portion 14 shown in FIG. 37.

FIG. 38 is a block diagram showing the greater details of the structure of the navigating portion 14 of FIG. 37. In FIG. 38, the navigating portion 14 includes a three-dimensional map display decision portion 141, a two-dimensional map display portion 142, and a three-dimensional map display portion 143.

The three-dimensional map display decision portion 141 decides whether to display a three-dimensional map on the basis of the vehicle position data generated in the position detecting portion 11, the route data generated in the route selecting portion 12, and the two-dimensional map data stored in the map data storage portion 13. After receiving the decision of not displaying a three-dimensional map from the three-dimensional map display decision portion 141, the two-dimensional map display portion 142 generates two-dimensional map display data on the basis of the vehicle position data generated in the position detecting portion 11, the route data generated in the route selecting portion 12, and the two-dimensional map data stored in the map data storage portion 13. After receiving the decision of requiring a three-dimensional display from the three-dimensional map display decision portion 141, the three-dimensional map display portion 143 generates three-dimensional map display data on the basis of the vehicle position data generated in the position detecting portion 11, the route data generated in the route selecting portion 12, and the two-dimensional map data stored in the map data storage portion 13.

Figure 39:
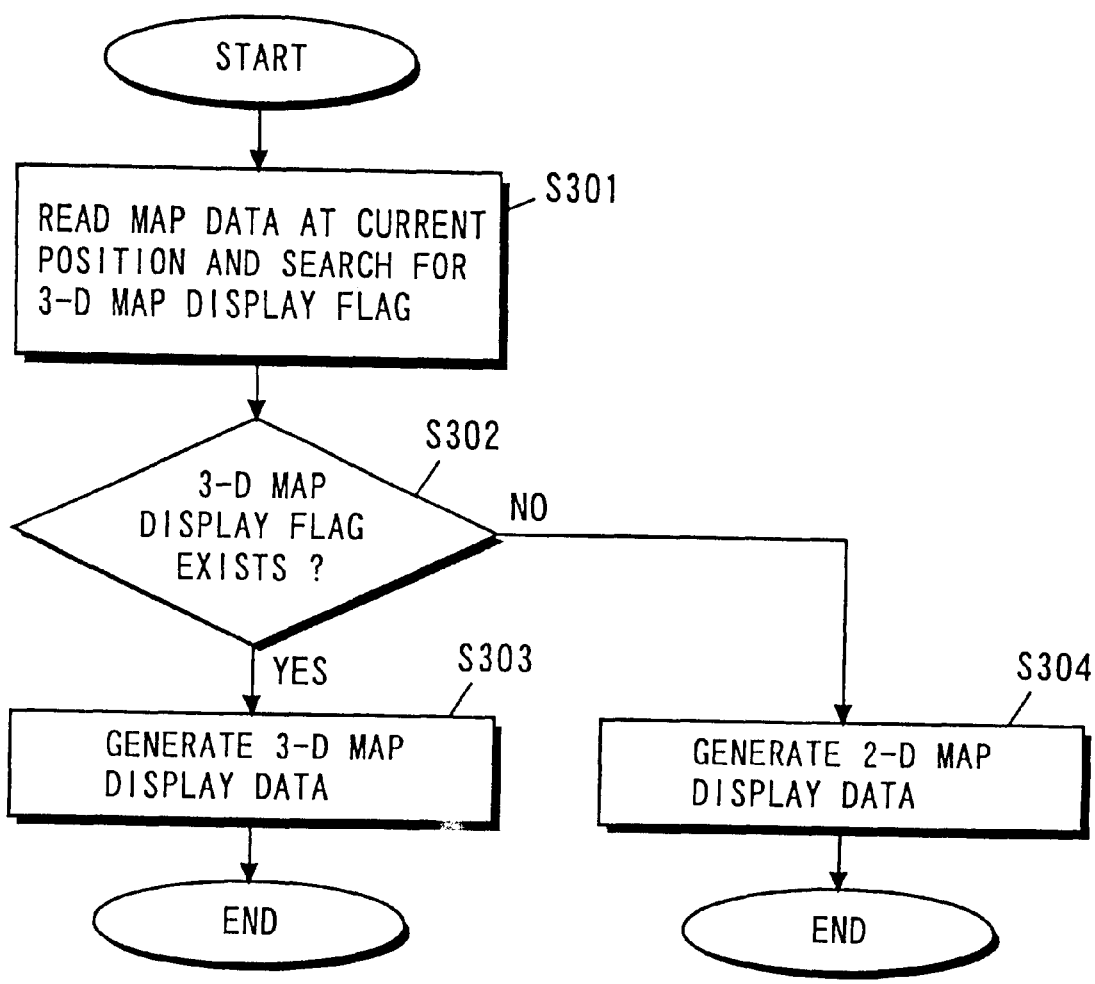
FIG. 39 is a flowchart showing the operation of the navigating portion 14 shown in FIG. 37.

FIG. 39 is a flowchart showing the operation of the navigating portion 14 shown in FIG. 37. The operation of the navigating portion 14 will now be described referring to FIG. 39.

First, the three-dimensional map display decision portion 141 reads the two-dimensional map data about the area corresponding to the current position detected in the position detecting portion 11 from the map data storage portion 13 and searches the read two-dimensional map data for a three-dimensional map display flag (step S301). Next, the three-dimensional map display decision portion 141 determines whether there is a three-dimensional map display flag from the result of the search (step S302). When a three-dimensional map display flag is not contained, the two-dimensional map display portion 142 generates the two-dimensional map display data (step S304). When a three-dimensional map display flag is contained, the three-dimensional map display portion 143 generates the three-dimensional map display data (step S303).

Figure 40:
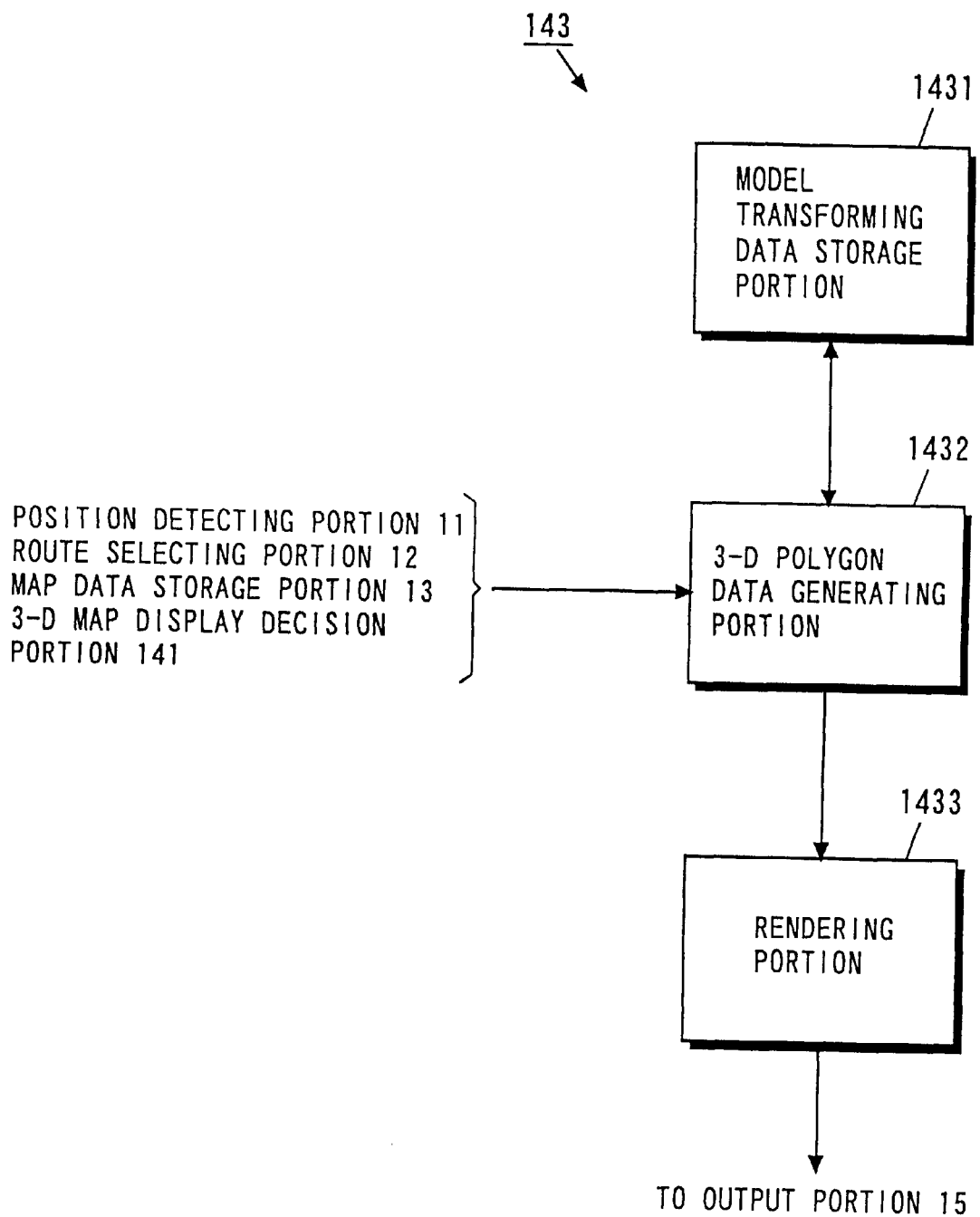
FIG. 40 is a block diagram showing the greater details of the structure of the three-dimensional map display portion 143 shown in FIG. 38.

FIG. 40 is a block diagram showing the structure of the three-dimensional map display portion 143 shown in FIG. 38 in greater detail. In FIG. 40, the three-dimensional map display portion 143 includes a model transforming data storage portion 1431, a three-dimensional polygon data generating portion 1432, and a rendering portion 1433.

The model transforming data storage portion 1431 is composed of a large-capacity storage device containing a CD-ROM or DVD as a storage medium, which contains the model transforming data created by the model transforming data creating device 1 shown in FIG. 1. The three-dimensional polygon data generating portion 1432 has the same structure as the three-dimensional polygon data generating portion 61 shown in FIG. 26, which generates three-dimensional polygon data on the basis of the model transforming data stored in the model transforming data storage portion 1431. That is to say, the three-dimensional polygon data generating portion 1432 reads the model transforming data corresponding to the road area to be three-dimensionally displayed from the model transforming data storage portion 1431 and selects a three-dimensional map display model corresponding to the road configuration pattern and extracts the parameter values about the road length, width, and the like. Then the three-dimensional polygon data generating portion 1432 sets the default values of parameters about the color and material of road, spacing and number of girders attached to elevated road, width of shoulders and height of sound-proof walls, and the like, and also refers to the three-dimensional polygon library for traffic lights and landmarks, and calculates the three-dimensional coordinates of the three-dimensional polygons to generate the three-dimensional polygon data. The rendering portion 1433 has the same structure as the rendering portion 62 shown in FIG. 26, which generates three-dimensional image data on the basis of the three-dimensional polygon data generated in the three-dimensional polygon data generating portion 1432. The generated three-dimensional image data is given to the output portion 15.

Figure 41:
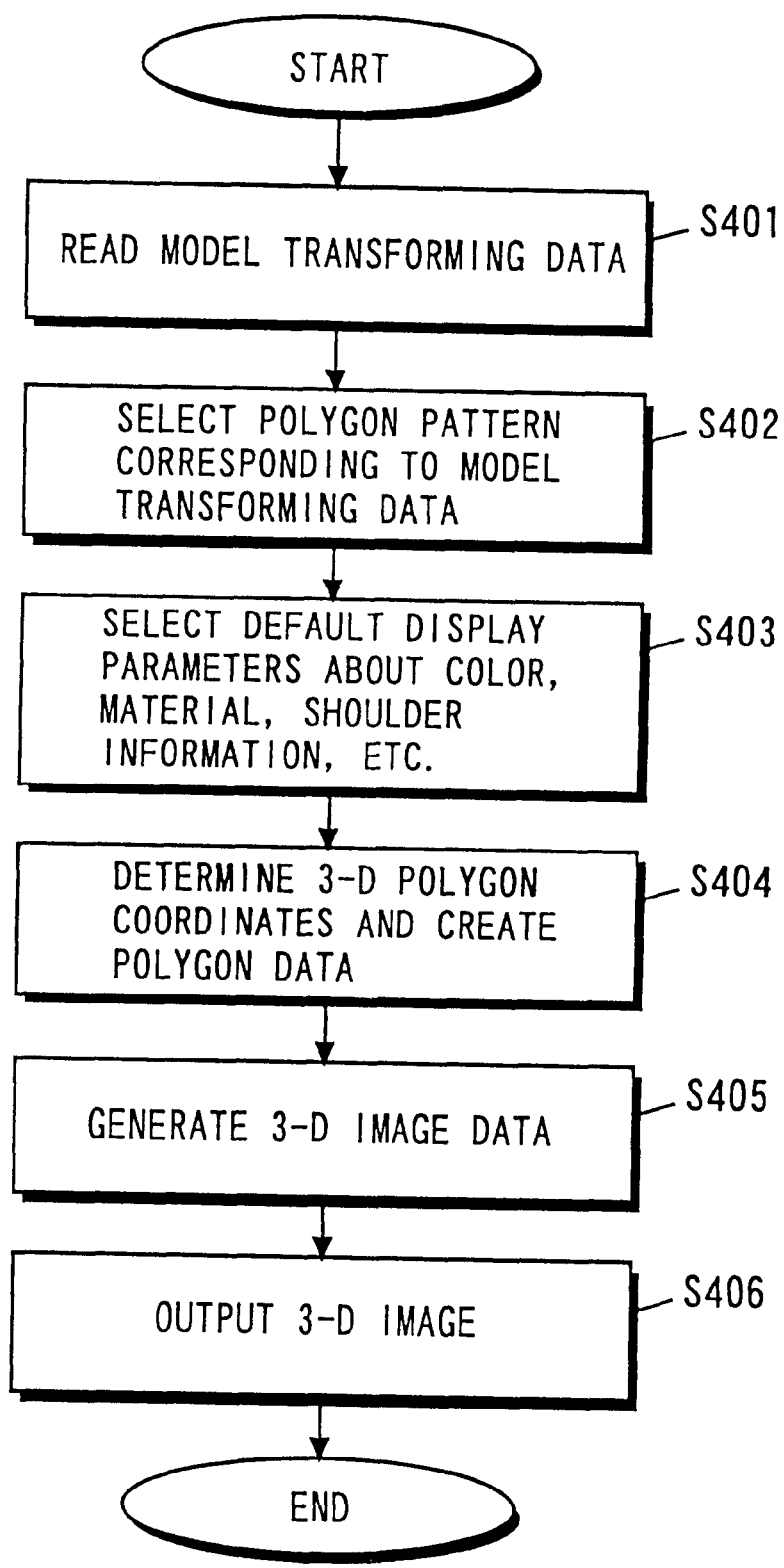
FIG. 41 is a flowchart showing the operation of the three-dimensional map display portion 143 shown in FIG. 40.

FIG. 41 is a flowchart showing the operation of the three-dimensional map display portion 143 shown in FIG. 40. Referring to FIG. 40, the operation of the three-dimensional map display portion 143 will be described. First, the three-dimensional polygon data generating portion 1432 reads model transforming data corresponding to the three-dimensionally displayed road area from the model transforming data storage portion 1431 (step S401), and analyzes the parameter data about the road area and selects a three-dimensional map display model corresponding to the road configuration pattern, as shown in FIG. 23, and extracts parameter values about the road length, road width, and the like. (step S402). Next, the three-dimensional polygon data generating portion 1432 reads the default values of parameters about the color and material of road, spacing and number of girders attached to elevated road, width of shoulders and height of sound-proof walls, and the like., and it also reads polygon data about traffic lights and landmarks stored in the three-dimensional polygon library in the three-dimensional polygon data generating portion 1432 (step S403). Then the three-dimensional polygon data generating portion 1431 calculates the three-dimensional coordinates of the three-dimensional polygons by referring to the information and data and thus creates the three-dimensional polygon data (step S404). Next, the rendering portion 1433 performs rendering on the basis of the three-dimensional polygon data created in step S404 to create the three-dimensional image data (step S405). Next, the rendering portion 1433 outputs the created three-dimensional image data to the output portion 15 (step S406).

Figure 42:
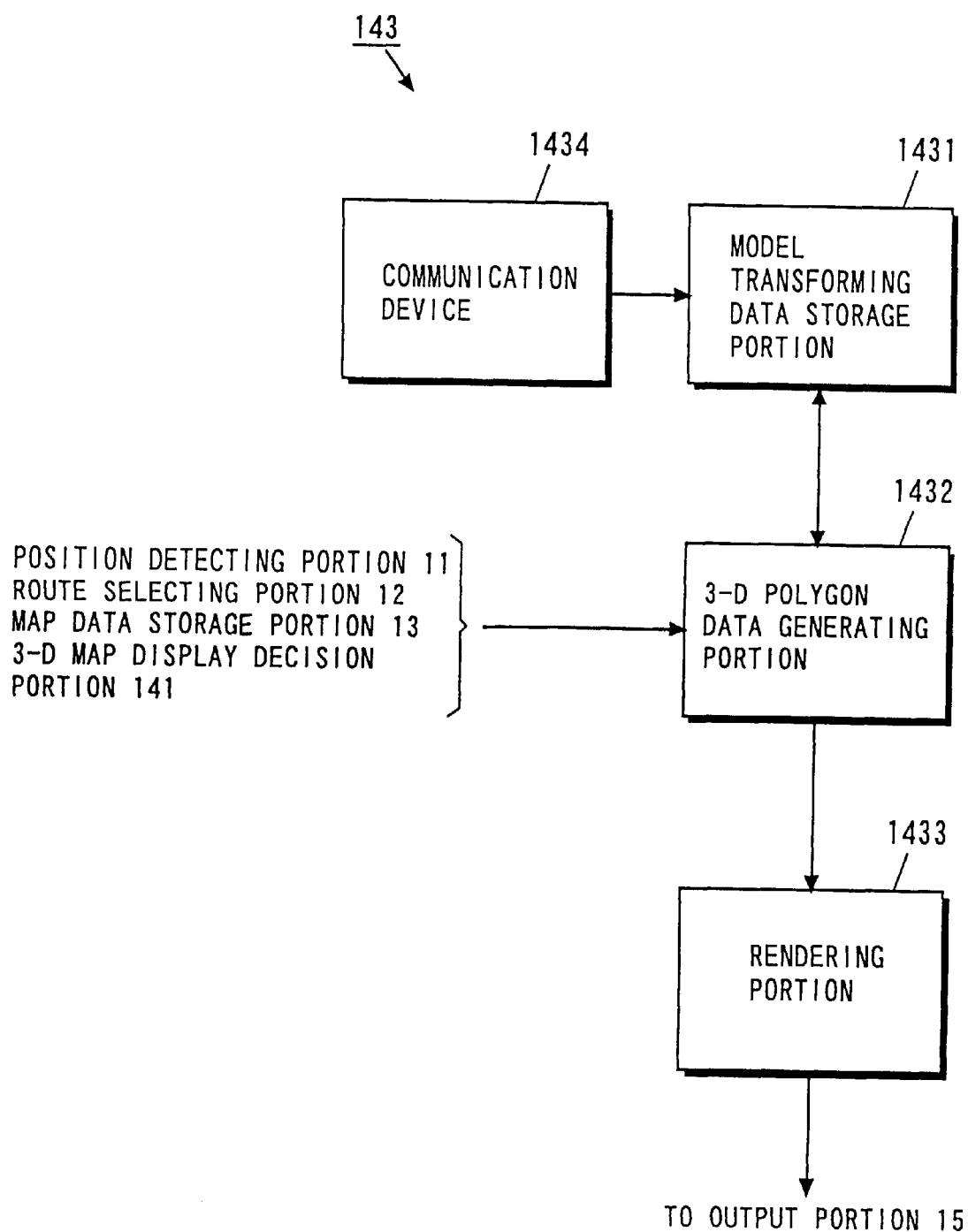
FIG. 42 is a block diagram showing the structure of a three-dimensional map display portion 143 having a communication device.

While the model transforming data is fixedly stored in the model transforming data storage portion 1431 in the embodiment shown in FIG. 40, a communication device 1434 may be added as shown in FIG. 42, in which case model transforming data transmitted from a center station (not shown) is received at the communication device 1434 and the model transforming data stored in the model transforming data storage portion 1431 is updated in a real-time manner.

Figure 43:
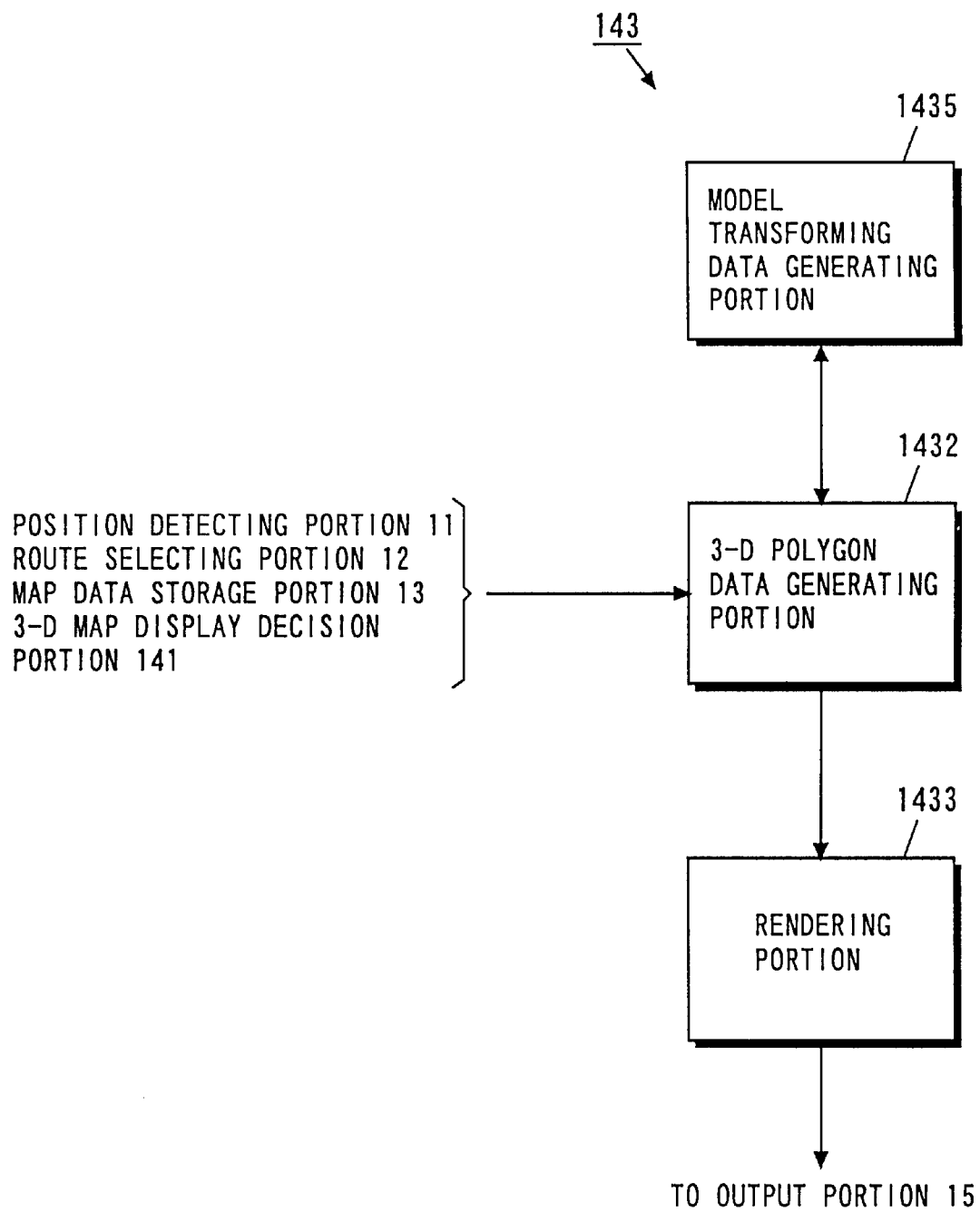
FIG. 43 is a block diagram showing another structure of the three-dimensional map display portion 143 shown in FIG. 38.

FIG. 43 is a block diagram showing another structure of the three-dimensional map display portion 143 shown in FIG. 38. In FIG. 43, the three-dimensional map display portion 143 includes a model transforming data generating portion 1435, the three-dimensional polygon data generating portion 1432, and the rendering portion 1433.

The model transforming data generating portion 1431 has the same structure as the model transforming data generating portion 4 and the pattern model storage portion 5 shown in FIG. 1, which generates model transforming data on the basis of the two-dimensional map data stored in the map data storage portion 13. The three-dimensional polygon data generating portion 1432 generates three-dimensional polygon data on the basis of the model transforming data generated in the model transforming data generating portion 1431. The rendering portion 1433 performs rendering on the basis of the three-dimensional polygon data created in the three-dimensional polygon data generating portion 1432 to create the three-dimensional image data. While the processing load on the navigation system is increased in this example since the model transforming data is generated in the navigation system, the amount of data stored inside is considerably reduced since the model transforming data is not stored in advance.

Industrial Applicability

As described above, the model transforming data generated in the present invention can effectively be used when displaying a three-dimensional map in a car navigation system, and the like.

What is claimed is:

1. A device for creating three-dimensional polygon data used to display a three-dimensional configuration of a given part on a map, said device comprising:
   a two-dimensional map data storage device operable to store two-dimensional map data;
   a parameter data extracting device operable to extract parameter data corresponding to the given part from the two-dimensional map data stored in said two-dimensional map data storage device;
   a parameter data analyzing device operable to analyze the parameter data extracted by said parameter data extracting device to generate model transforming data;
   a three-dimensional polygon data generating device operable to generate the three-dimensional polygon data by applying the model transforming data generated by said parameter data analyzing device to a corresponding three-dimensional map display model to transform a form of the three-dimensional map display model; and
   a three-dimensional polygon data storage device operable to store the three-dimensional polygon data generated by said three-dimensional polygon data generating device.

2. The three-dimensional polygon data creating device according to claim 1, wherein said three-dimensional polygon data generating device comprises a form attribute storing device operable to store a parameter relating to a safe wall of an elevated road, and generate the three-dimensional polygon data by referring to the parameter stored in said form attribute storing device.

3. A navigation device for displaying a safe wall of an elevated road based on the three-dimensional polygon data generated by the three-dimensional polygon data creating device according to claim 2.

4. The three-dimensional polygon data creating device according to claim 2, wherein the parameter relating to the safe wall of the elevated road comprises a setting position offset, a width of the safe wall, and a height of the safe wall.

5. A device for creating three-dimensional image data used to display a three-dimensional configuration of a given part on a map, said device comprising:
   a two-dimensional map data storage device operable to store two-dimensional map data;
   a parameter data extracting device operable to extract parameter data corresponding to the given part from the two-dimensional map data stored in said two-dimensional map data storage device;
   a parameter data analyzing device operable to analyze the parameter data extracted by said parameter data extracting device to generate model transforming data;
   a three-dimensional polygon data generating device operable to generate three-dimensional polygon data by applying the model transforming data generated by said parameter data analyzing device to a corresponding three-dimensional map display model to transform a form of the three-dimensional map display model;
   a three-dimensional image data generating device operable to generate the three-dimensional image data on a basis of the three-dimensional polygon data generated by said three-dimensional polygon data generating device; and
   a three-dimensional image data storage device operable to store the three-dimensional image data generated by said three-dimensional image data generating device.

6. A three-dimensional map display device for displaying a three-dimensional configuration of a given part on a map, wherein the three-dimensional configuration of the given part on the map is classified in advance into a plurality of patterns and a transformable three-dimensional map display model is prepared for each of the patterns, said three-dimensional map display device comprising:
   a two-dimensional map data storage device operable to store two-dimensional map data;
   a parameter data extracting device operable to extract parameter data corresponding to the given part from the two-dimensional map data stored in said two-dimensional map data storage device;
   a parameter data analyzing device operable to analyze the parameter data extracted by said parameter data extracting device to generate model transforming data used to transform a form of the three-dimensional map display model;

an image data generating device operable to generate three-dimensional image data by applying the model transforming data generated by said parameter data analyzing device to the corresponding three-dimensional map display model to transform the three-dimensional map display model into a desired form; and a display device operable to display the three-dimensional configuration of the given part on a basis of the three-dimensional image data generated by said image data generating device.

7. The three-dimensional map display device according to claim 6, further comprising a pattern model storage device operable to store pattern data defining parameters required when transforming the form of the three-dimensional map display model for each of the patterns;

wherein said parameter data analyzing device comprises:
a pattern data reading device operable to read out the pattern data corresponding to the given part from said pattern model storage device; and a data converting device operable to convert the parameter data extracted by said parameter data extracting device into the model transforming data on the basis of the pattern data read by said pattern data reading device.

8. The three-dimensional map display device according to claim 7, wherein said pattern data reading device comprises a pattern determining device operable to determine the pattern on a basis of the parameter data extracted by said parameter data extracting device and read out the pattern data corresponding to the determined pattern from said pattern model storage device.

9. The three-dimensional map display device according to claim 8, wherein said pattern determining device comprises:

a branching part road attribute deciding device operable to decide attributes of roads around a branching point on a basis of the parameter data extracted by said parameter data extracting device; and a branch type deciding device operable to decide a type of the branching on the basis of the road attributes decided by said branching part road attribute deciding device to determine the pattern.

10. The three-dimensional map display device according to claim 9, wherein said parameter data analyzing device further comprises:

a parameter data classifying device operable to classify the parameter data according to road function on a basis of the pattern determined by said pattern determining device; and a data integrating device operable to integrate the parameter data classified by said parameter data classifying device within each classified group;

wherein said data converting device is operable to convert the parameter data integrated by said data integrating device into the model transforming data.

11. The three-dimensional map display device according to claim 10, wherein said parameter data classifying device comprises:

a link tracing device operable to trace a desired link on a basis of the two-dimensional parameter data extracted by said two-dimensional parameter data extracting device and temporarily store and hold data of the traced link; and a link data classifying device operable to classify the link data stored and held in said link tracing device on a basis of the pattern determined by said pattern determining device.

12. The three-dimensional map display device according to claim 7, wherein said data converting device is operable to obtain values of part of the parameters defined by the pattern data read by said pattern data reading device directly from the parameter data extracted by said parameter data extracting device and obtain remaining parameter values by inference.

13. The three-dimensional map display device according to claim 6, wherein said three-dimensional map display device is installed in a car navigation device for navigating a vehicle on the map.

14. A three-dimensional map display device for displaying a three-dimensional configuration of a given part on a map, wherein the three-dimensional configuration of the given part on the map is classified in advance into a plurality of patterns and a transformable three-dimensional map display model is prepared for each of the patterns, said three-dimensional map display device comprises:

a model transforming data storage device operable to; store model transforming data for transforming a shape of the three-dimensional map display model;

an image data generating device operable to generate three-dimensional image data by reading out the model transforming data corresponding to the given part and applying the model transforming data to the corresponding three-dimensional map display model to transform the three-dimensional map display model into a desired form; and a display device operable to display the three-dimensional configuration of the given part on a basis of the three-dimensional image data generated by said image data generating device.

15. The three-dimensional map display device according to claim 14, wherein said three-dimensional map display device is installed in a car navigation device for navigating a vehicle on the map.

* * * * *